US 12,452,288 B2

(12) United States Patent
Porras et al.

(10) Patent No.: US 12,452,288 B2
(45) Date of Patent: Oct. 21, 2025

(54) SYSTEMS AND METHODS FOR TRAINING AGAINST ADVERSARIAL ATTACKS

(71) Applicant: SRI International, Menlo Park, CA (US)

(72) Inventors: Phillip Andrew Porras, Cupertino, CA (US); Keith M. Skinner, Sunnyvale, CA (US); Kenneth C. Nitz, Redwood City, CA (US); Dayne Brian Freitag, Descanso, CA (US); Paul Stern Kalmar, La Mesa, CA (US)

(73) Assignee: SRI International, Menlo Park, CA (US)

( * ) Notice: Subject to any disclaimer, the term of this patent is extended or adjusted under 35 U.S.C. 154(b) by 115 days.

(21) Appl. No.: 18/521,319

(22) Filed: Nov. 28, 2023

(65) Prior Publication Data

US 2024/0179177 A1  May 30, 2024

Related U.S. Application Data

(60) Provisional application No. 63/385,228, filed on Nov. 29, 2022.

(51) Int. Cl.
*H04L 9/40* (2022.01)
*G06N 20/00* (2019.01)

(52) U.S. Cl.
CPC ......... *H04L 63/1433* (2013.01); *G06N 20/00* (2019.01)

(58) Field of Classification Search
None
See application file for complete search history.

(56) References Cited

U.S. PATENT DOCUMENTS

2025/0131417 A1 * 4/2025 Wolfe ................ G06F 21/00

* cited by examiner

*Primary Examiner* — Cai Y Chen
(74) *Attorney, Agent, or Firm* — McDonnell Boehnen Hulbert & Berghoff LLP

(57) ABSTRACT

A method for creating a training playbook to train a potential target of social engineering against an attack by an adversarial actor includes generating a training playbook based on a plurality of conversational patterns from a respective plurality of dialogs between non-human synthetic persona with the adversarial actor. A given conversational pattern of the plurality of conversational patterns comprises one or more dialog interaction elements utilized by the adversarial actor during a respective dialog of the plurality of dialogs. The method also includes configuring a dialog model for a second synthetic persona to engage in a training dialog with a target trainee to train the target trainee to detect, avoid and/or mitigate a future attack by the adversarial actor. The dialog model is configured to emulate the future attack by the adversarial actor by utilizing the training playbook. The method additionally includes outputting the training playbook.

20 Claims, 12 Drawing Sheets

Example Dialog Script

"DialogOrder": [
"intro_method",
"stop_if_no_exit1",
"more_information",
"stop_if_no_exit2",
"coworker_info",
"exit"].

165

Example Introduction Method with Slot Filling

170

"intro_method": [ "Good morning,\n\tMy name is %P_Firstname %P_Lastname and I'm a hiring manager for Lumon Biotech. I'm trying to verify the work history of a candidate for a position with our company and I'm hoping you might be able to help. Can you confirm that Bill Jones worked as a Senior Project Administrator for XYZ from 1996 - 2014?\n\nRespectfully,\n%P_Firstname %P_Lastname\n" ]

Example Branching

{
"tag": "out_of_office",
"input": ["I am out of the office", "I will be on vacation",
"I will be back in the office", "I am away from email", "I am traveling"
],
"responses":
["response_out_of_office",
        "exit"]
}
"response_out_of_office" : [
    "Sorry we missed you. We may contact you when you return."
]

175

Example Training

180

{
"tag": "upgrade",
"input": ["are you ready to upgrade?", "you need to upgrade now", "need more reasons to upgrade?" ],
"responses": ["I was wondering if you could [email, tell] me more about the upgrade.", "Can you tell me more?", "Can you tell me more about the upgrade?"]
}

FIG. 1B

1110 Generating a training playbook based on a plurality of conversational patterns from a respective plurality of dialogs between non-human synthetic persona with an adversarial actor, wherein a given conversational pattern of the plurality of conversational patterns comprises one or more dialog interaction elements utilized by the adversarial actor during a respective dialog of the plurality of dialogs

1120 Configuring a dialog model for a second synthetic persona to engage in a training dialog with a target trainee to train the target trainee to detect, avoid and/or mitigate a future attack by the adversarial actor, wherein the dialog model is configured to emulate the future attack by the adversarial actor by utilizing the training playbook

1130 Outputting the training playbook

FIG. 11

SYSTEMS AND METHODS FOR TRAINING AGAINST ADVERSARIAL ATTACKS

CROSS-REFERENCE

This application claims priority to U.S. Provisional Patent Application No. 63/385,228, titled "Adversarial Attack Training System and Methods," filed on Nov. 29, 2022, which is hereby incorporated by reference in its entirety.

GOVERNMENT LICENSE RIGHTS

This invention was made with Government support under contract no. FA8650-18-C-7880 awarded by Air Force Research Laboratory. The Government has certain rights in this invention.

BACKGROUND

Electronic communications are a core component in a variety of daily tasks, both personal and professional. Electronic communication can be performed over different modes, such as electronic mails, instant messages, telephonic messages, and so forth. Several platforms and services are available to enable electronic communications. As such communications become ubiquitous, so do communications from potentially hostile agents that attempt to extract information, such as protected information related to personal, medical, financial, and other data. Some attacks may be directed to security networks to extract information from an organization's secured systems. Spear-phishing messages are generally individualized and engineered to bypass spam filters. Targeted individuals are not trained to recognize the phishing playbooks and tactics used by seasoned phishers.

Social Engineering Attacks (SEAs) have increased approximately 270% in 2021. Around 91% of the successful data breaches were initiated with a spear phishing attack. More than 80% of cyber-attacks and over 70% of those from nation states are initiated by exploiting human engagement as opposed to computer or network security flaws. State-of-the-art anti-spam defense systems are typically not a match for sophisticated phishing threats. Datasets to mine multi-round phishing conversations at scale, that can drive new detection and training technologies, are generally not available.

SUMMARY

In a first aspect, a computer-implemented method for creating a training playbook to train a potential target of social engineering against an attack by an adversarial actor is provided. The method includes generating a training playbook based on a plurality of conversational patterns from a respective plurality of dialogs between non-human synthetic persona with the adversarial actor. A given conversational pattern of the plurality of conversational patterns comprises one or more dialog interaction elements utilized by the adversarial actor during a respective dialog of the plurality of dialogs. The method also includes configuring a dialog model for a second synthetic persona to engage in a training dialog with a target trainee to train the target trainee to detect, avoid and/or mitigate a future attack by the adversarial actor. The dialog model is configured to emulate the future attack by the adversarial actor by utilizing the training playbook. The method additionally includes outputting the training playbook.

In a second aspect, a system for creating a training playbook to train a potential target of social engineering against an attack by an adversarial actor is provided. The system includes a database system configured to store data associated with a training, a management system configured to access the database system and manage the training, one or more processors, and data storage. The data storage has stored thereon computer-executable instructions that, when executed by the one or more processors, cause the management system to perform operations. The operations include retrieving, based on one or more target-persona pairing attributes comprising an identity of a target trainee, an identity of a synthetic persona, and one or more training parameters and from the database system, a previously generated training playbook, the previously generated training playbook having been generated based on a plurality of conversational patterns from a respective plurality of dialogs, wherein a given conversational pattern of the plurality of conversational patterns comprises one or more dialog interaction elements utilized by the adversarial actor during a respective dialog of the plurality of dialogs. The operations also include configuring, based on the one or more target-persona pairing attributes and from the database system, a dialog model for a synthetic persona to engage in a training dialog with the target trainee to train the target trainee to detect, avoid and/or mitigate a future attack by the adversarial actor. The dialog model is configured to emulate the future attack by the adversarial actor by utilizing the previously generated training playbook. The operations also include initializing, based on the previously generated training playbook, the dialog model to engage in the training dialog with the target trainee. The operations further include deploying the synthetic persona to engage in the training dialog with the target trainee.

In a third aspect, a computing device for creating a training playbook to train a potential target of social engineering against an attack by an adversarial actor is provided. The computing device includes one or more processors and data storage. The data storage has stored thereon computer-executable instructions that, when executed by the one or more processors, cause the computing device to perform operations. The operations include generating a training playbook based on a plurality of conversational patterns from a respective plurality of dialogs between non-human synthetic persona with the adversarial actor, wherein a given conversational pattern of the plurality of conversational patterns comprises one or more dialog interaction elements utilized by the adversarial actor during a respective dialog of the plurality of dialogs. The operations also include configuring a dialog model for a second synthetic persona to engage in a training dialog with a target trainee to train the target trainee to detect, avoid and/or mitigate a future attack by the adversarial actor, wherein the dialog model is configured to emulate the future attack by the adversarial actor by utilizing the training playbook. The operations additionally include outputting the training playbook.

In a fourth aspect, an article of manufacture is provided. The article of manufacture includes a non-transitory computer-readable medium having stored thereon program instructions that, upon execution by one or more processors of a computing device, cause the computing device to carry out operations. The operations include generating a training playbook based on a plurality of conversational patterns from a respective plurality of dialogs between non-human synthetic persona with the adversarial actor, wherein a given conversational pattern of the plurality of conversational patterns comprises one or more dialog interaction elements utilized by the adversarial actor during a respective dialog of the plurality of dialogs. The operations also include configuring a dialog model for a second synthetic persona to engage in a training dialog with a target trainee to train the target trainee to detect, avoid and/or mitigate a future attack by the adversarial actor, wherein the dialog model is configured to emulate the future attack by the adversarial actor by utilizing the training playbook. The operations additionally include outputting the training playbook.

BRIEF DESCRIPTION OF THE FIGURES

FIG. 1B illustrates example scripts for a training playbook, in accordance with example embodiments.

FIG. 11 illustrates an example method, in accordance with example embodiments.

DETAILED DESCRIPTION

Figure 1A:
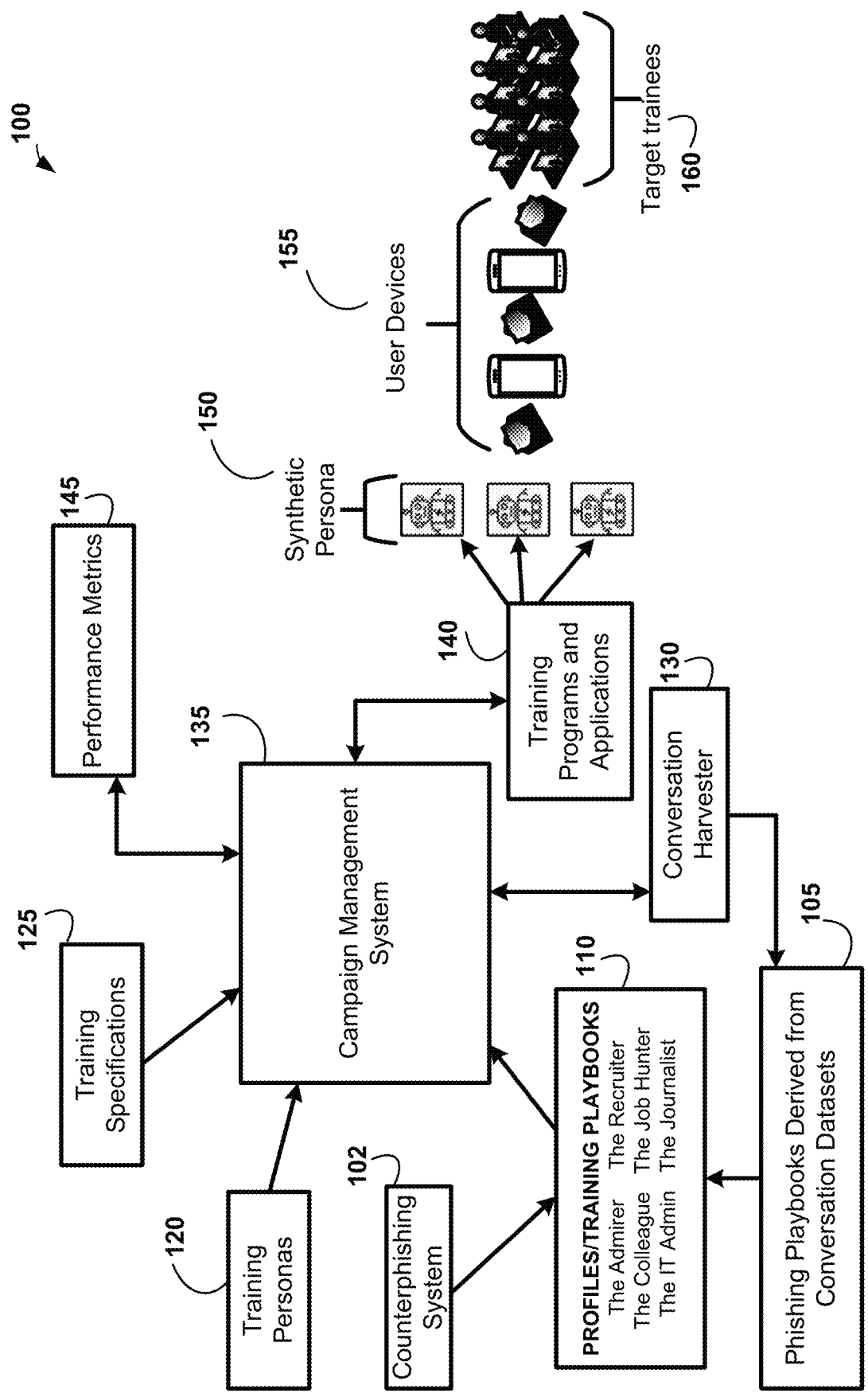
FIG. 1A illustrates an example security awareness training environment, in accordance with example embodiments.

Sophisticated social engineering campaigns are generally waged against organizations rather than individuals. Adversaries can leverage victim information exposed publicly (e.g., through social media accounts). Adversaries may engage in trust-building dialogs, such as for elicitation campaigns or fraudulent action requests to conduct elicitation campaigns, disinformation, and manipulation of the victim. For example, an adversary may approach an organization through multiple contact points but may employ the same or similar phishing playbooks in each case, the use of which may reveal their presence and objectives.

In some aspects, such threats may be addressed by developing defenses against sophisticated social engineering campaigns by adversaries that possess the resources to study potential victims, the skills to exploit this knowledge during dialog engagements with their victims, and the patience to defer a victim's compromise for maximum eventual success and impact. Such adversary scenarios may be referred to herein as confidence campaigns. The depth of knowledge that confidence campaign agents gain about victims renders victims particularly vulnerable and increases the agents' sensitivity to anomalous behavior that might suggest exposure to a countermeasure. Furthermore, the willingness of these agents to play a slow game, to effect a compromise over multiple turns, greatly weakens or invalidates detection methods that only consider single point-to-point interactions.

The term "dialog" as used herein, may generally refer to an electronic communication involving different modes (e.g., electronic mail, short messaging system, text, etc.), speech (e.g., conversations via telephone, Voice-over-IP, etc.), textual transcriptions of speech, and so forth. For example, a dialog engagement can involve two parties engaging in a speech-based conversation. Also, for example, a speech-to-text conversion may be used to transform speech from a first party (e.g., phisher) into text, send the text electronically to the target, convert the text to speech, and provide the speech to the target. Also, for example, a text-to-speech conversion may be used to transform text input by a first party (e.g., phisher) into speech, send the speech to the target (e.g., as a voice message, or a telephone call), and/or convert the speech to text, and provide the transcription to the target.

Intelligent bots have been demonstrated to perform well in live-fire phishing attacks and can enable scalable conversation-depth mining of phishers and their tactics. The information mined from such large scale real conversations can be used to design a large number of counterphish playbooks, also referred to herein as phishing playbooks, which can then be used to design training modules, including training playbooks, to train individuals and groups to identify phishing attacks, and successfully defend against such attacks.

In particular, phishing playbooks used by phishers can be understood and designed based on conversation-depth analytics. These conversation-depth analytics datasets enable an isolation of phisher attributes, gestures, and repeated phishing playbook patterns. Such data can be used to design fully-automated artificial intelligence (AI)-driven security awareness trainings at scale.

For example, bots that execute phishing playbooks may be trained in order to build a next generation of counterphish training so that the knowledge gleaned from learning phishing playbook strategies in real phishing activities can be incorporated into a dialog model. A phishing playbook is a dialog interaction strategy implemented by the adversarial actor. The playbook may include the steps that an adversarial actor may take to social engineer, such as cause someone to wiretap money, reveal bank or credit card details, divulge confidential information, and so forth. Playbooks deployed by adversarial actors may use common themes or strategies. For example, each round of a phishing dialog between a synthetic bot and an adversarial actor may be designed to elicit one or more attributes of the adversarial actor, extract one or more forensic signatures of the adversarial actor, reveal a conversational pattern of the adversarial actor, and so forth. The term "conversational pattern" may be patterns that may be extracted from electronic communications, including text. Conversational patterns may also be discerned from speech, including attributes such as an accent, a tone, grammatical attributes, slangs, dialects, and other voice-based characteristics.

In some embodiments, conversational patterns may involve one or more dialog interaction elements. For example, deeper analysis may be performed by recognizing both individual conversations, as well as conversation threads in the deep dialog, along with associated thematics. For example, phishing attacks tend to follow phishing playbooks based dialog interaction strategies such as repeated and/or sequential use of one or more dialog interaction elements that may be used against the target user. For example, dialog interaction elements (or verbal gestures in an electronic message, or message thematics) such as flattery, urgency, a threat, use of abusive language, issuance of an ultimatum, a payment then reward strategy, presenting a financial opportunity, providing an anonymous contact point, a personal protected information (PPI) request, a payment stipulation, a recipient recrimination, an alternate contact modality, or an indication of waiting for a response, etc. may be used. In some embodiments, such dialog interaction elements may be auto-harvested from natural language classification systems using supervised learning. A phishing playbook may be responsive to a target's response, or a lack thereof. The strategies may be agnostic to a particular natural language.

The bot can perform training at scale and train a large number of people with a large number of conversations. Thus social engineering attack training can be performed using a conversational bot configured to execute a training playbook, where the training playbook is derived from real phishing conversations. The training playbook may be based on signatures (e.g., phisher attributes) extracted from phishing emails, message patterns that distinguish phisher types, and abstract conversation models that can enable reverse engineering of social engineering attack playbooks, referred to herein as phishing playbooks.

Generally, labels for messages can be detected based on synthetic personas engaging with target trainees, and several rounds of conversation may be carried out to identify attributes and forensic signatures. In some embodiments, one or more web interfaces may be configured that enable individuals to play through a variety of different scenarios. Accordingly, training can be based on an automated training playbook generation derived from real phishing playbooks, as well as a specification language that enables organizations to build personalized training playbooks depending on an audience for a training program.

In some embodiments, a web interface may be configured where a user may enter a training playbook configuration, a target trainee, and a synthetic training bot, and initiate a training playbook. A message may be generated based on the training playbook and a trainee may be engaged by the synthetic training bot using the generated message as a training exercise. Each time the trainee responds, a new message may be generated based on the training playbook. For example, if the training playbook includes a request for protected information in the third message, followed by a message indicating urgency in the seventh message, and a recriminating message in the tenth message, then the web interface automatically generates these messages and personalizes the messages for the target trainee, and the synthetic training bot engages with the target trainee.

FIG. 1A illustrates an example security awareness environment 100, in accordance with example embodiments. Data from an analysis of scalable conversation-depth mining of phishers and their phishing playbooks may be used to generate effective training strategies that mimic multi-level, multi-modal, multi-pronged approach to training. Users can tailor the training program to suit their time, industry, threats, expertise, etc.

For example, a plurality of phisher profiles or training playbooks 110 (examples provided with reference to FIG. 2) may be derived from counterphishing system 102, such as from conversation datasets 105 generated by counterphishing system 102. In some embodiments, training playbooks 110 may be generated based on a plurality of conversational patterns from a respective plurality of dialogs with the adversarial actor. The plurality of dialogs may be stored in conversation datasets 105. A given conversational pattern of the plurality of conversational patterns may include one or more dialog interaction elements utilized by the adversarial actor during a respective dialog of the plurality of dialogs. In some embodiments, the one or more dialog interaction elements may include a flattery, an urgency, a threat, use of abusive language, issuance of an ultimatum, a payment then reward strategy, presenting a financial opportunity, providing an anonymous contact point, a personal protected information (PPI) request, a payment stipulation, a recipient recrimination, an alternate contact modality, or an indication of waiting for a response.

Campaign management system 135 may manage a training campaign by identifying a training playbook from phisher profiles 110, patterns from conversation harvester 130, a synthetic persona from personas 120, training specifications 125 indicating campaign configuration parameters, and by utilizing training programs and applications 140 (e.g., applications such as YAHOO®, PROTOMAIL®, GMAIL®, FACEBOOK®, LINKEDIN®, TWITTER®, SMS®, WHATSAPP®, and so forth). The term "training campaign" as used herein may generally refer to a training program to train one or more target trainees. A campaign may include a set of synthetic training personas 120 and target trainees 160 that are to be targets of simulated phishing attacks. The training campaign may also include a set of dialog models to be used by the synthetic personas to carry out the simulated phishing attacks. Campaign management system 135 may be configured to manage the training campaign. For example, campaign management system 135 may identify a training campaign, and provide training playbooks to the synthetic personas, so that the dialog model associated with the synthetic persona applies the training playbook in practice against the target trainee. Campaign management may be performed at scale.

Generally, a training dialog may be personalized. For example, a training playbook may be configured as a JSON structure used to define how campaign management system 135 reacts to a response from a target trainee. The training playbook provides a 'directed conversation' by taking the target trainee along in steps or script, making statements, asking questions, and processing those questions with further dialog or actions. The training playbook may be configured for slot filling (e.g., entering the target trainee's name or organization) and macros (e.g., an ability to formulate a message in multiple ways). For example, the training playbook may be configured to allow for multiple ways of communicating similar messages tailored to different target trainees (e.g., randomly choosing a message, or choosing the message based on a personality of a target trainee). Such configurations may be successful in bypassing spam detectors.

FIG. 1B illustrates example scripts for a training playbook, in accordance with example embodiments. An example of a dialog script 165 is illustrated. Dialog script 165 illustrates a dialog order that initiates a dialog with an introduction method, followed by an execution of a first termination criterion, eluciditating more information, execution of a second termination criterion, soliciting coworker information, and then exiting the dialog.

An example of an introduction method with slot filling 170 may allow the introduction method to be tailored to a training program, and/or user. For example, an introduction may begin with a salutation, an identity of the synthetic persona, a title, a purpose of the message, and an end portion of the message, including a signature, and so forth. The script may include slots that may be filled to personalize the message.

In some embodiments, campaign management system 135 may use semantic text understanding to determine a content of the target trainee's responses. In the event the target trainee's message appears to be off the main script (e.g., deviates from an expected response), campaign management system 135 may be configured to understand that and branch to another script and respond appropriately. An example may be to continue on with the script, or exit the training dialog (e.g., when the user says "Stop this now, I don't want to talk to you!"). An example branching 175 may involve an out-of-office (OOO) message indicating various reasons for being OOO (e.g., vacation, travel, etc.). In example branching 175, text input by the user may be semantically compared to the text in 'input', and upon a determination of substantial similarity, campaign management system 135 may respond with a "response_out_of_office" message.

Training programs and applications 140 may include a suite of training programs and/or applications that may be used to deliver training using a plurality of bots 150 that deliver training to target trainees 160 via a plurality of devices 155 (e.g., mobile, laptop, desktop, cloud server, etc.). Training programs and applications 140 may collect training-related data and provide this data to campaign management system 135. In turn, campaign management system 135 may generate performance metrics 145 that may be used to design better training programs, more effective training playbooks, deliver feedback and/or requests to counterphishing system 102 for additional data (e.g., conversation datasets 105, and so forth).

For example, training data may be generated that analyzes actual phishing emails, categorizes them, and identifies common sentences. Example training 180 illustrates an "upgrade" example. The 'input' may be derived from emails, and the response to the input may be provided by an operator. For example, the text input by a user that is targeted by a phishing email may be semantically compared to the text in 'input', and upon a determination of substantial similarity, training bots 506 may train the user to provide one of the 'responses'.

A reduction in successful phishing attacks can be a measurable outcome for AI-driven security awareness environment 100. Such training modules can be licensed to organizations for training purposes, for example, via a SaaS platform.

Training may be witting or unwitting. Unwitting training can involve approaching a target trainee to entice them to disclose information. For example, an employee of Company A may be approached by a recruiter with a $600k opportunity at Company B. The recruiter, unbeknownst to the employee, could be working for Company A to determine if the employee would reveal confidential information about Company A to the recruiter. An example of witting training may involve target trainee being trained on a series of training components. The training components (e.g., 30-minute segments) may guide the target trainee through a series of scenarios using a user interface. An intelligent bot may engage the target trainee in a conversation that mimics tactics used by a phisher.

For example, the intelligent bot may attempt to elicit information that the target trainee is not supposed to provide. As the training plays out, the target trainee may be trained to become aware of the tactics, how a phisher may try to pivot the target trainee based on their responses, and so forth. In some situations, the target trainee may be trained on six or seven self-training exercises. In some embodiments, the intelligent bots may be evaluated based on performance metrics. In some examples, a decision tree may be used to guide, conduct, and/or pivot a conversation. For example, the decision tree may be based on a series of possible outcomes of a successful customer engagement, and/or a positive customer experience.

In some embodiments, a hybrid dialog model may be deployed that includes pivoting between different channels, languages, social media platforms, and so forth, to engage the target trainee. Such a multi-channel strategy may include switching from an email to a post on a social networking platform, to an instant message, as some examples. Generally, any form of social media interaction, and/or any channel used for an SEA may be used for response and/or engagement strategies.

In some embodiments, training modules may be provided by a dialog model operating over a web interface. The dialog model may be driven by an open training playbook language or dialogue model language that allows a user to activate a multi-round conversation. For example, a dialog model may be designed with a tailored introduction that may include an identity of a synthetic persona as a sender, and an identity of a trainee (e.g., name, email, telephone, title in the organization, etc.). When an intelligent bot sends an introductory message, the recipient (e.g., trainee) may become alerted and refuse to engage. In such a situation, the dialog model may be configured to entice the recipient to engage in a conversation. On the other hand, if the individual begins to engage in a conversation, the dialog manager may attempt to elicit a set of attributes from the recipient, such as contact information, account numbers, or passwords. Each time, the dialog model can pivot based on the response from the recipient. For example, a recruiter bot can engage an employee to elicit confidential information related to the organization. Also, for example, an equipment bot can elicit hardware or software related information from the trainee to gain unauthorized access to computing systems. Some embodiments involve inserting a selectable hyperlink into the outgoing message, wherein a selection of the selectable hyperlink by the target trainee causes the target trainee to reveal protected information.

For example, sentiment/emotion analysis (such as angry or sad or happy) may be performed on a message, and the training playbook responses may be configured based upon a result of such analysis. For example, the sentiment/emotion may be used to either mirror the emotion or provide an opposite response. In some embodiments, labels such as '<angry>' or '<sad>' may be used; however, in an absence of a label, a baseline response strategy may be applied. For example, a "baseline" response may be "I'll think about giving you my phone number and contact you tomorrow," whereas an "angry" response may be "How dare you ask for my phone number! I'll never give it out to someone like you!".

The web interface may be configured so that a synthetic bot is specified, one or more attributes of a target trainee is specified, a type of campaign (e.g., recruiter, media personnel, IT professional, etc.) may be specified, and an introductory message with an introductory paragraph may be automatically generated based on the type of campaign. Messages that are exchanged between the synthetic bot and the target trainee may be analyzed for intent, linguistic patterns, dialog interaction elements, forensic signatures, and so forth, and the conversation may be dynamically pivoted based on each message received.

Figure 2:
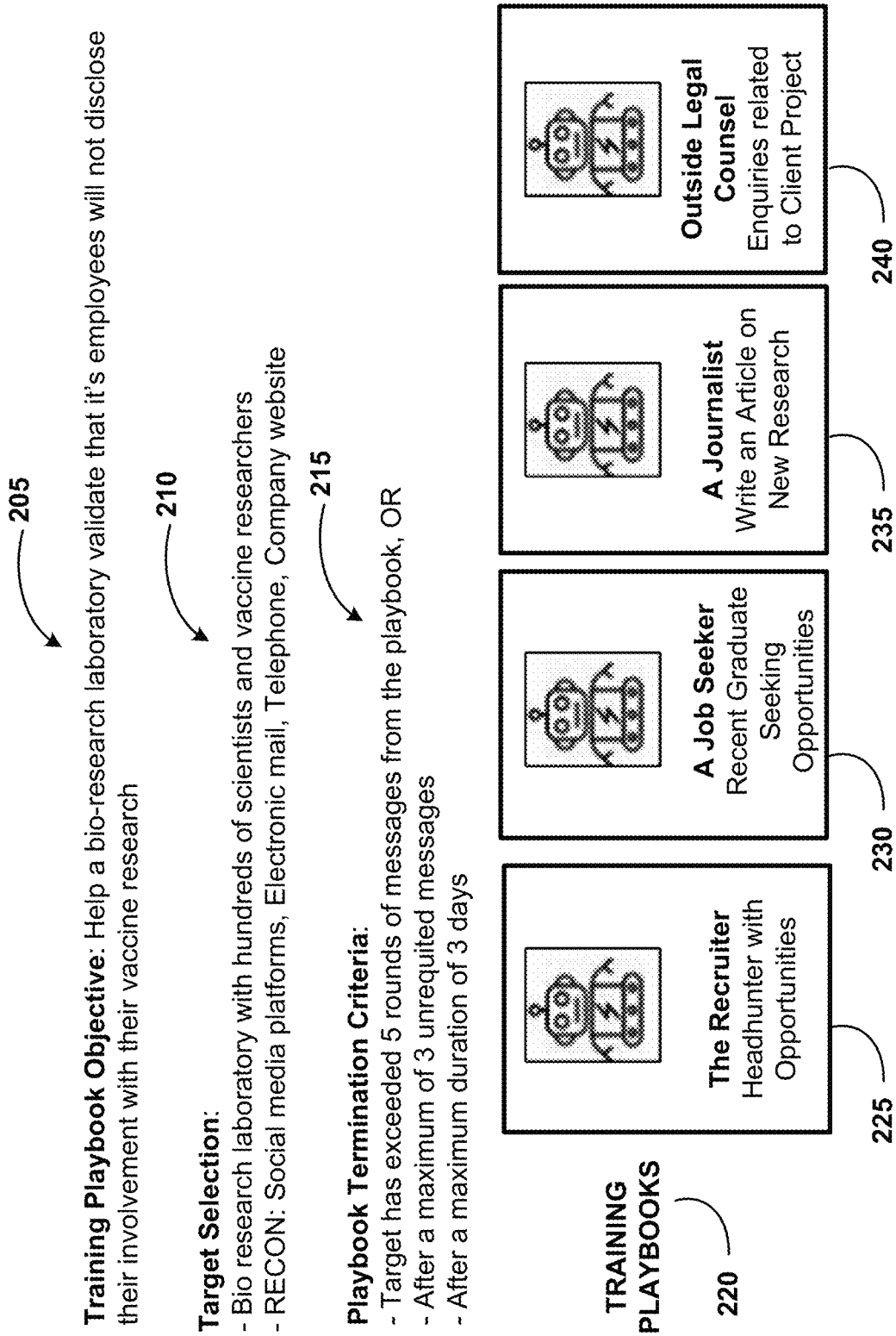
FIG. 2 illustrates example training playbooks, in accordance with example embodiments.

FIG. 2 illustrates example training playbooks, in accordance with example embodiments. Different training playbooks involving different kinds of phishers and/or different kinds of target trainees may be designed. A trainee may build custom dialog models that mimic various phishing scenarios. Organizations may also have an ability to personalize the trainings based on a type of industry (e.g., finance, accounting, education, recruitment, etc.).

A training playbook is generally a human-editable specification language for specifying a custom dialog model. Training playbooks may be designed to be rapidly authored by users with minimal training. Training playbook elements may include intent specification (e.g., introduction methods, inquiry methods, subdialog management, conditional dialogs, schedule control, etc.), custom inquiry methods, branch discussion handling, custom knowledge extraction, and/or termination criteria.

For example, a training playbook may be designed with training playbook objective 205 that may be configured to assist a bio-research lab validate that its researchers will not disclose their involvement with their vaccine research (e.g., COVID-19 vaccine research). Target selection 210 may involve identifying a Bio-Science Lab with hundreds of biologists and vaccine researchers. Modes of communication may include LINKEDIN™, email, phone, corporate website, research databases/websites, etc. The playbook termination criteria 215 may include, for example, when ta message count exceeds five (5) rounds of messages from the playbook, after a maximum three (3) unrequited messages, and/or a three (3)-day maximum duration.

Based on such training parameters, various profiles or training playbooks 220 may be generated. For example, a recruiter profile 225 can correspond to a headhunter with an opportunity for Covid-19 researchers, a job seeker profile 230 can correspond to a recent graduate seeking opportunities in Covid-19 vaccine research, a journalist profile 235 can correspond to a journalist writing an article on new research efforts in Covid-19 vaccines, and an outside counsel profile 240 can correspond to an outside counsel sending inquiries related to protection of intellectual property related to a new Covid-19 vaccine. Additional, and/or alternative profiles/playbooks may be generated.

For example, different synthetic bots may be associated with conversation bots (or dialog models), which in turn may be based on different training playbooks. For example, if a particular organization were to deploy such conversation bots to train its personnel, then new training playbooks may be tailored based on different characters and custom dialogue models. These models may be designed based on large scale conversation harvesting of real-world phishing conversations.

Figure 3:
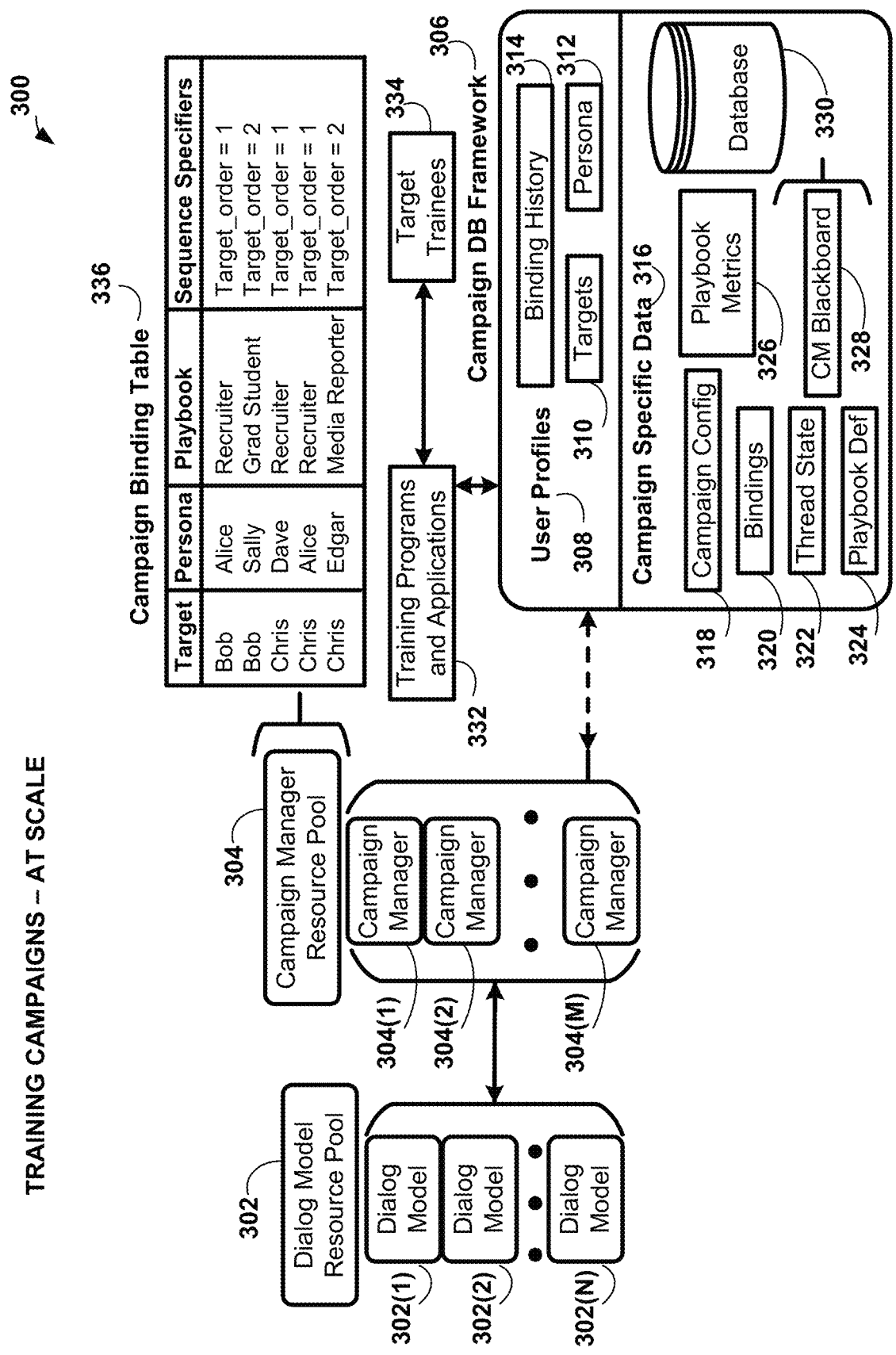
FIG. 3 illustrates example security awareness training campaigns, in accordance with example embodiments.

FIG. 3 illustrates example security awareness training campaigns 300, in accordance with example embodiments. The campaign management system (CMS) may initiate conversations with target trainees 334 using a set of synthetic personas that may be associated with one or more training playbooks. In some embodiments, containers may be used in the CMS. Example campaign simulations may involve experimental test cases using AWS® and KUBERNETES® with a large number (e.g., 100,000) of training targets. The training campaigns may be run at scale. For example, dialog model (DM) resource pool 302 may include a plurality of dialog models 302(1), 302(2), . . . , 302(N). Also, campaign manager (CM) resource pool 304 may include a plurality of campaign managers 304(1), 304(2), . . . , 304(M). One or more of the plurality of dialog models 302(1), 302(2), . . . , 302(N) and the plurality of campaign managers 304(1), 304(2), . . . , 304(M) may be in communication with one another.

Campaign database framework 306 may be in communication with a DM resource pool 302 that includes a plurality of dialog managers, and a campaign manager (CM) resource pool 304 that includes a plurality of campaign managers. Campaign database framework 306 may include user profiles 308 comprising targets 310, persona 312, and binding history 314. Campaign database framework 306 may include campaign specific data 316 such as campaign configuration files 318, bindings 320, thread state 322, playbook definition file 324, playbook metrics 326, CM Blackboard 328, and so forth. Data may be stored by campaign database framework 306 in database 330. Examples of such campaign specific data 316 are described below.

Campaign database framework 306 may be in communication with training programs and applications 332 that provide training to target trainees 334. Also, for example, DM resource pool 302 and campaign manager (CM) resource pool 304 may receive data from campaign database framework 306 and a data structure, such as campaign binding table 336. The training playbooks may be designed based on such data. For example, campaign binding table 336 may include a training target (e.g., Bob, Chris, etc.) in the first column, a synthetic persona in the second column (e.g., Alice, Sally, Dave, Alice, Edgar, etc.). The synthetic persona may communicate with the training target in lieu of a phisher to train the target trainee against potential social engineering attacks. In some embodiments, the training playbook may be configured to emulate a recruiter, a graduate student, a media reporter, an admirer, a colleague, a job seeker, or an information technology specialist. Campaign binding table 336 may list a training playbook (e.g., recruiter, graduate student, recruiter, media reporter, etc.) in the third column, and may list a sequence specifier in the fourth column that indicates a target order.

For example, campaign binding table 336 indicates two targets, Bob and Chris. The training goal is to target Bob and Chris using different training playbooks. Referring to the first row of campaign binding table 336, conversations may be initiated with target named Bob using a synthetic persona or conversation bot named Alice. Alice may be configured to initiate conversations with Bob as a recruiter. Accordingly, Alice may be configured to use a training playbook such as a recruiter playbook. The recruiter playbook may be configured to converse with Bob to determine whether or not Bob is interested in an employment opportunity. As part of the recruiter playbook, Alice may attempt to extract information related to Bob, his employer, place of employment, clients, projects, scientific information, and so forth.

Referring to the second row of campaign binding table 336, conversations may be initiated with target named Bob using a synthetic persona or conversation bot named Sally. Sally may be configured to initiate conversations with Bob as a graduate student. Accordingly, Sally may be configured to use a training playbook such as a graduate student playbook. The graduate student playbook may be configured to converse with Bob as a graduate student interested in an employment opportunity in Bob's company. As part of the graduate student playbook, Sally may attempt to extract information related to Bob, his employer, place of employment, clients, funding, and so forth. The sequence specifier indicating "Target_order=1" specifies that Bob may be first targeted by Alice, and the specifier indicating "Target_order=2" specifies that Bob may be subsequently targeted by Sally.

Similarly, referring to the third to the fifth rows of campaign binding table 336, conversations may be initiated with target named Chris using synthetic personas or conversation bots named Dave, Alice, and Edgar. Dave and Alice may be configured to initiate conversations with Chris as recruiters, and Edgar may be configured to initiate conversations with Chris as a media reporter. The sequence specifier indicating "Target_order=1" specifies that Chris may be targeted by Dave and Alice as recruiters first, and the specifier indicating "Target_order=2" specifies that Chris may be subsequently targeted by Edgar as a media reporter.

Campaign DB framework 306 may include user profiles 308. For example, user profiles for Bob and Chris may be found in campaign DB framework 306. For example, targets 310 may include, for each target (e.g., Bob, Chris), a name, an email address, occupation, and so forth. Persona 312 may include information associated with synthetic personas (e.g., Alice, Sally, Dave, Edgar). Binding history 314 may be a repository of historical data associated with campaign binding table 336.

Campaign DB framework 306 may include campaign-specific data 316. For example, campaign configuration 318 may be associated with the plurality of campaign managers 304(1), 304(2), . . . , 304(M). Campaign configuration 318 may include information that the plurality of campaign managers 304(1), 304(2), . . . , 304(M) may access to implement a training campaign. For example, campaign configuration 318 may include a start and/or end date for the campaign, start and/or end time for the campaign, termination logic to end the campaign, a number of messages to be exchanged during the campaign, and other control parameters for the campaign.

Bindings 320 may indicate data flowing from the data structure, such as campaign binding table 336. Thread state 322 may include the state of the campaign. For example, the plurality of dialog models 302(1), 302(2), . . . , 302(N), and the plurality of campaign managers 304(1), 304(2), . . . , 304(M) may be stateless. However, state information may be stored in thread state 322. This may include the email exchanges, and so forth. Thread state 322 may be associated with, and store, different conversations that the plurality of dialog models 302(1), 302(2), . . . , 302(N) initiate with target trainees 334.

Playbook definitions 324 may describe how a synthetic persona carries out a particular campaign. For example, playbook definitions 324 may include the different training playbooks such as a recruiter, a graduate student, a media reporter and so forth. Playbook definitions 324 may include templates for a training playbook.

Playbook metrics 326 may be configured to capture information associated with a given thread. For example, a number of flags received, metrics indicating performance of the campaign (e.g., on a per thread basis). Playbook metrics 326 may indicate how the playbook performed against different targets, errors received, messages that were sent or not sent, messages that elicited responses, a duration of the campaign, and so forth.

CM blackboard 328 may be an open state that enables the plurality of campaign managers 304(1), 304(2), . . . , 304(M) to enter a state to be managed. Data may be stored in database 330 (e.g., a MONGODB® database).

Generally, a given CM of the plurality of campaign managers 304(1), 304(2), . . . , 304(M) may refer to campaign binding table 336, and retrieve data from campaign DB framework 306. For example, to initiate a training campaign based on the first row of campaign binding table 336, the given CM may retrieve a user profile for Bob from targets 310, and a synthetic persona for Alice from persona 312. The given CM may also obtain campaign specific data 316, including data associated with a recruiter playbook. Subsequently, the given CM may provide this information to a given DM from DM resource pool 302. The DM resource pool 302 may allocate the task to a given DM of the plurality of dialog models 302(1), 302(2), . . . , 302(N).

The given DM may then initiate the training program targeting Bob with the synthetic persona, Alice, based on the training playbook (e.g., recruiter playbook). For example, Alice initiates an email message to Bob, and sends the information to the given CM, and becomes stateless. The given DM is stateless and provides the message to the given CM. The given CM may store the message in database 330 and cause the thread state to be displayed (e.g., on a graphical user interface (GUI)). For example, the GUI may indicate a new message in an outbound queue. Subsequent conversations with Bob may be added to the campaign DB framework 306, and provided for display via the GUI. Each interaction with training target Bob may be processed, stored, and displayed. The CMs and the DMs may be stateless, and may be implemented as KUBERNETES® resource pools, whereby containers may be created and used based on a given workload.

Figure 4:
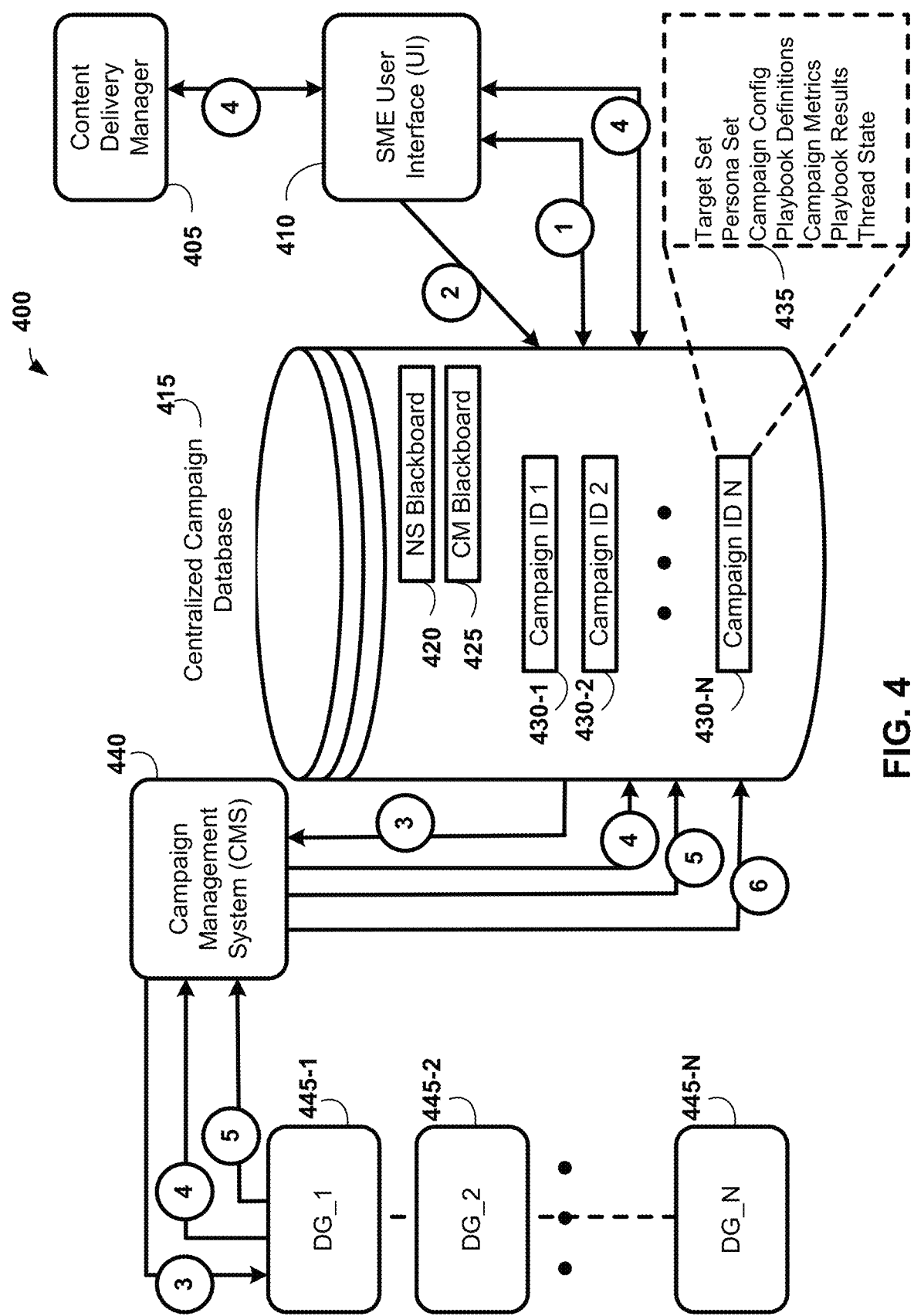
FIG. 4 illustrates example execution and procedural flows implemented by a Campaign Management System (CMS), in accordance with example embodiments.

FIG. 4 illustrates example execution and procedural flows 400 implemented by a Campaign Management System (CMS), in accordance with example embodiments. Generally, CMS 440 may be designed to initiate and manage a social engineering attack (training) campaign comprising the initiation of social engineering training playbooks against a set of target trainees (e.g., target trainees 160, target trainees 334, etc.). In some embodiments, CMS 440 may be configured to employ a data centric architecture for conducting scalable SEA training exercises.

CMS 440 may perform one or more functions including an ability to respond to start/pause/stop control changes to campaign document. One example function may be to launch conversation threads for bindings compliant with the campaign status and ordering parameters. CMS 440 may detect newly received messages and engage a plurality of dialog generation components (DGs) (e.g., DG_1 445-1, DG_2 445-2, . . . , DG_N 445-N) for a response. CMS 440 may manage DG-collected flags, and store campaign and/or thread-related states into a centralized campaign database 415.

The centralized campaign database 415 may operate one or more centralized blackboards (e.g., NS Blackboard 420, CM Blackboard 425, etc.) for managing campaigns. This may include support for task replication and/or coordination. The CMS 440 operators may use, for example, Compact RESTful APIs, which may include database object-identifier (OID) notifier calls. Dialog model and CMS state information may be maintained in centralized campaign database 415.

As an example process flow, at step 1, a subject matter expert (SME) may use a user interface (UI), such as SME UI 410, to define a campaign, identified by a campaign identifier (ID) (e.g., campaign ID 1 430-1, campaign ID 2 430-2, . . . , campaign ID N 430-N). A campaign ID may include parameters 435, such as a target set, a persona set, a campaign configuration, playbook definitions, campaign metrics, playbook results, and a thread state. SME UI 410 may store the campaigns in centralized campaign database 415.

At step 2, an SME may use SME UI 410 to initiate a campaign. For example, the campaign may be identified using a campaign identifier (ID) (e.g., campaign ID 1 430-1, campaign ID 2 430-2, . . . , campaign ID N 430-N).

At step 3, CM 440 may manage a campaign. For example, CM 440 may invoke a training playbook based on one or more target-persona pairing attributes.

At step 4, an SME may use SME UI 410 to communicate with content delivery manager 405, to manage content deliveries to internet platforms applications (e.g., YAHOO®, PROTONMAIL®, GMAIL®, FACEBOOK®, LINKEDIN®, TWITTER®, SMS®, WHATSAPP®, and so forth). Based on a particular campaign ID, a dialog generator (e.g., DG_1 445-1, DG_2 445-2, . . . , DG_N 445-N) may generate a response and provide the response to CMS 440. The response may be stored in centralized campaign database 415, and provided to content delivery manager 405. Similarly, responses from a trainee may be received, and stored in centralized campaign database 415.

At step 5, dialog generator (e.g., DG_1 445-1, DG_2 445-2, . . . , DG_N 445-N) may report conversation outcomes and/or captured conversation flags to CMS 440. CMS 440 may store such information in centralized campaign database 415.

At step 6, CMS 440 may control campaign execution and store state management data in centralized campaign database 415.

Generally speaking, SME UI 410 provides control of the campaign to an SME, provides visibility into centralized campaign database 415, and facilitates analysis of the data in centralized campaign database 415.

Example Architectures

Figure 5:
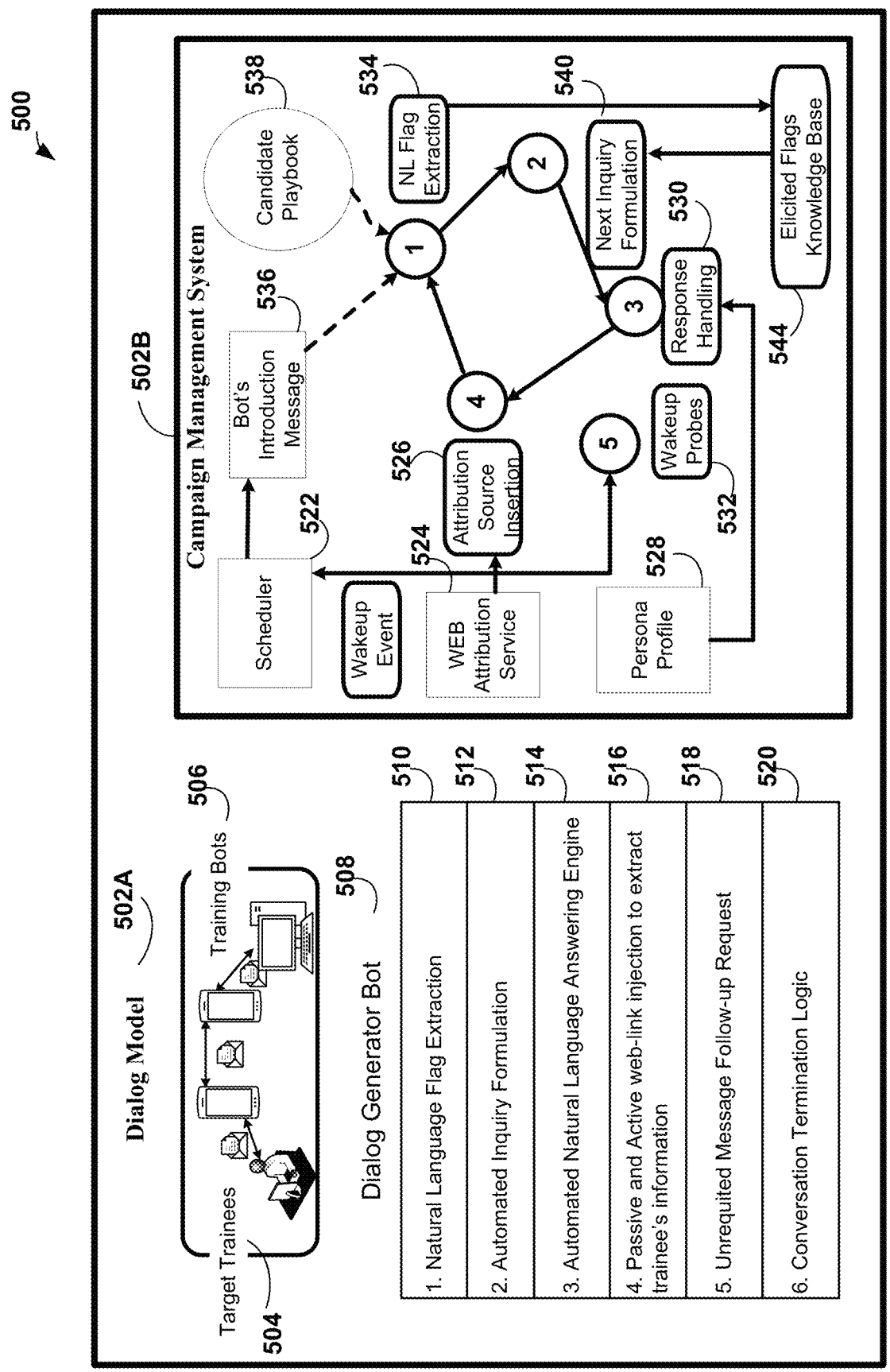
FIG. 5 illustrates an example harvester, in accordance with example embodiments.

FIG. 5 illustrates an example training system 500, in accordance with example embodiments. Training system 500 comprises a dialog model 502A and a campaign management system (CMS) 502B. Training system 500 is used to communicate autonomously with people via text or email (although it could transfer to a human if necessary). It uses a directed conversational system that uses training playbooks to manage a conversation with a user. The training playbook directs the conversation by using a step-by-step method, and if the user says something out of the normal flow of the conversation, training system 500 may handle this by branching to another series of steps, after which it may either terminate the conversation (e.g., when the user says "Go away!" or something similar to terminate the conversation), or branch back to the main dialog to continue the discussion.

CMS 502B may arrange, organize, and schedule the data flow through the dialog model 502A. In some embodiments, CMS 502B may be a central coordination system and storage service. For example, a received message may be evaluated by CMS 502B for thread assignment (e.g., in two-party conversations), and conversational thread objects may be spawned as needed. Dialogue generator bot 508 (e.g., DG_1 445-1, DG_2 445-2, . . . , DG_N 445-N of FIG. 4) may determine scheduled response messages, and scheduler 522 may handle initiating the delivery at an appropriate time. DGs may indicate a scheduled waiting period for a response. In the event CMS 502B does not detect a response within that period, it may request the DG to generate a follow-on (or "unrequited") message, which is also scheduled. This sequence may be repeated until either a response is received, or a configured limit (e.g., 6) is reached. Attribution flags for conversation threads may be aggregated and consolidated, and updates may be submitted to reporting services. CMS 502B may also be configured to detect email "bounce" messages, marking the unreachable email address internally, and suppressing subsequent activity on the affected threads. CMS 502B may be configured to maintain a system's persistent state (e.g., for restart recovery).

Dialog model 502A monitors and generates communications between target trainees 504 and training bots 506. Training bots 506 may be configured to autonomously send phishing emails to target trainees 504. Phishing emails may be designed based on social engineering and such emails generally attempt to elicit personal information or money in either a direct or round-a-bout way. Training bots 506 may be configured based on training playbooks to play the role of adversarial attackers or phishers, and communicate with target trainees 504 to keep them engaged, and to obtain information from target trainees 504 either by asking for it, or by extracting and/or inferring it from their communications, such as, for example, when they have information in an email signature block. Training bots 506 may use natural language processing (NLP), and string comparisons to extract the information. Training bots 506 may keep track of the information requested and what has been received, in a database along with the conversation, and may follow up if sufficient information has not been received.

Dialog model 502A may extract information from the conversation, such as addresses or phone numbers. In the conversation, dialog model 502A may ask for a phone number or WHATSAPP® number to extract more information, extract the information, and store it with the conversation in a database. If target trainees 504 don't provide the information, dialog model 502A may perform a follow-up, or abandon the effort to obtain information. Generally, dialog model 502A may use NLP, semantic text similarity (STS) (e.g., using GOOGLE® STS Bidirectional Encoder Representations from Transformers (BERT)), sentiment analysis, and/or string comparisons to extract the information and move along the steps.

For example, training bots 506 may be trained using training data to know what to say to target trainees 504 because training bots 506 may test the semantic text similarity (STS) (e.g., using GOOGLE® STS BERT) on the emails. Training bots 506 may be trained to analyze an email, rank sentences appearing in the email, and output highly relevant results. Training bots 506 may be trained to add on questions for obtaining information if not already found, and add in comments certain words or phrases are identified. As described with reference to FIG. 1B, training data may be generated that analyzes actual phishing emails, categorizes them and identifies common sentences.

In the event target trainees 504 do not receive a reply within a certain amount of time, training bots 506 may train target trainees 504 to respond back with follow-on messages, such as, "Why don't you respond to me?" or "I am waiting for your email!" Generally, such types of emails may further engage training bots 506 to provide additional responses. Such training enables users to successfully thwart attacks, and prevent them from potentially providing additional information.

Dialog model 502A may extract data from the communications between target trainees 504 and training bots 506. For example, dialog generator bot 508 may perform operations such as natural language flag extraction 510, automated inquiry formulation 512, execute an automated natural language answer engine 514, passive and/or active web-link injection to extract a trainee's information 516, follow-up requests on unrequited messages 518, and/or execute conversation termination logic 520.

In some embodiments, dialog model 502A may determine a rate of engagement associated with the dialog model, wherein the rate of engagement is indicative of a success rate of the dialog model in the engaging in a dialog with target trainees 504. For example, a rate of engagement (RoE) may be determined for each of the deployed dialog models. The rate of engagement indicates a success rate at which a target trainee responds to a message sent by the deployed dialog model, and/or is enticed to open an attribution resource (i.e., an attribution web-link).

In some embodiments, a per-thread RoE may be determined for each conversation thread (or dialog). Also, for example, an RoE for each target trainee may be determined. This indicates, for example, a number of unique synthetic personas that the target trainee engaged with. In some embodiments, a performance of a group of target trainees may be evaluated based on a type of information being released by the trainees in the group. For example, the database may be accessed for such information, and the information may be organized and displayed graphically. Upon selection of a trainee, a group of trainees, a type of persona, and so forth, detailed data may be displayed indicating metrics for such entities, and a history of interactions the training system.

In some embodiments, the different RoEs may be used to determine a training strategy. For example, a future deployment of the dialog model may be based on the rate of engagement. For example, a high RoE for a target trainee may result in a strategy where multiple dialog models are deployed together. Also, for example, a low per thread RoE may indicate that a different conversation thread be used in the training program. As another example, dialog models may be deployed based on their individual RoEs. In some embodiments, an individual RoE may change from one target trainee to another. For example a first dialog model may have a high individual RoE in engaging with a first target trainee, and may have a low individual RoE in engaging with a second target trainee. Also, a second dialog model may have a low individual RoE in engaging with the first target trainee, and may have a high individual RoE in engaging with the second target trainee. Accordingly, the first dialog model may be deployed to engage with the first target trainee, and the second dialog model may be deployed to engage with the second target trainee. Other combinations and/or permutations are possible.

Scheduler 522 may initiate an introduction message 536 from training bots 506. This can involve a method of introduction that may be formulated based on training target 504 and customized for the training target 504. For example, when training target 504 is named "John Smith," the introduction message 536 may begin with "Dear John," or "Dear Dr. Smith," and so forth. The introduction message 536 may be based on a template stored in training playbook 538.

At step 1, introduction message 536 and playbooks from training playbook 538 may be received. Upon receiving a response to introduction message 536, dialog generator bot 508 may perform natural language flag extraction 534 to extract relevant details about training target 504. The extracted flags are provided to knowledge base 544.

At step 2, dialog generator bot 508 may perform automated inquiry formulation 512 based on data from knowledge base 544 to formulate a next inquiry (e.g., at next inquiry formulation 540).

At step 3, dialog generator bot 508 may perform response handling 530 based on a next inquiry generated by automated inquiry formulation 512 and persona profile 528. Generally, training playbook 538 may indicate a set of information to be collected from target trainees 504. Accordingly, CMS 502B may maintain a repository of information already obtained, and next inquiry formulation 540 may be based on the information yet to be obtained. For example, if a date of birth and social security number have been obtained, then CMS 502B may determine that a telephone number, a credit card, and a street address remain to be determined. Accordingly, next inquiry formulation 540 may formulate a next inquiry to elicit the missing information. Persona profile 528 may be generated based on information about target trainees 504, such as job title, types of projects, job location, and so forth. In some embodiments, in the event that a significant piece of information is obtained, next inquiry formulation 540 may be configured to ask more in-depth questions under an assumption that the target trainee has been engaged in a deeper conversation.

At step 4, dialog generator bot 508 may perform attribution resource insertion 526 (e.g., passive and/or active web-link injection to extract a trainee's information 516), based on resources retrieved from web attribution service 524. For example, target trainees 504 may be provided with web links, etc. to cause them to click on potentially dangerous links. And the process proceeds to step 1.

Scheduler 522 may communicate with wake-up probes 532 at step 5, to trigger follow-up requests on unrequited messages. For example, scheduler 522 may determine that a response to a previous message has not been received from target trainees 504, and a threshold time (e.g., 48 hours) has expired. This may trigger step 5 that involves sending an additional message (e.g., "hey do you have any update on that information we requested," or "could you get back to me soon on this? I actually need this info before I can proceed," etc.). Scheduler 522 may be configured with a logic to manage a dialogue. For example, scheduler 522 may monitor dialog progression and state, and determine when to allow training bots 506 to activate, hibernate, or re-engage with target trainees 504.

For example, the logic for scheduler 522 may include a limit on a number of messages sent and/or exchanged (e.g., a total of 5 messages sent, or a total engagement of at most 10 message exchanges, etc.), a time between messages (e.g., 48 hours), a limit on an amount of time during which to engage (e.g., total of 7 days, etc.), an amount of information to extract, and so forth.

Generally, conversation termination logic 520 may be activated when scheduler 522 determines that one or more of the dialog parameters has been reached. For example, when a threshold amount of information has been extracted, a message limit has been reached, a total engagement time period has elapsed, and so forth.

Figure 6:
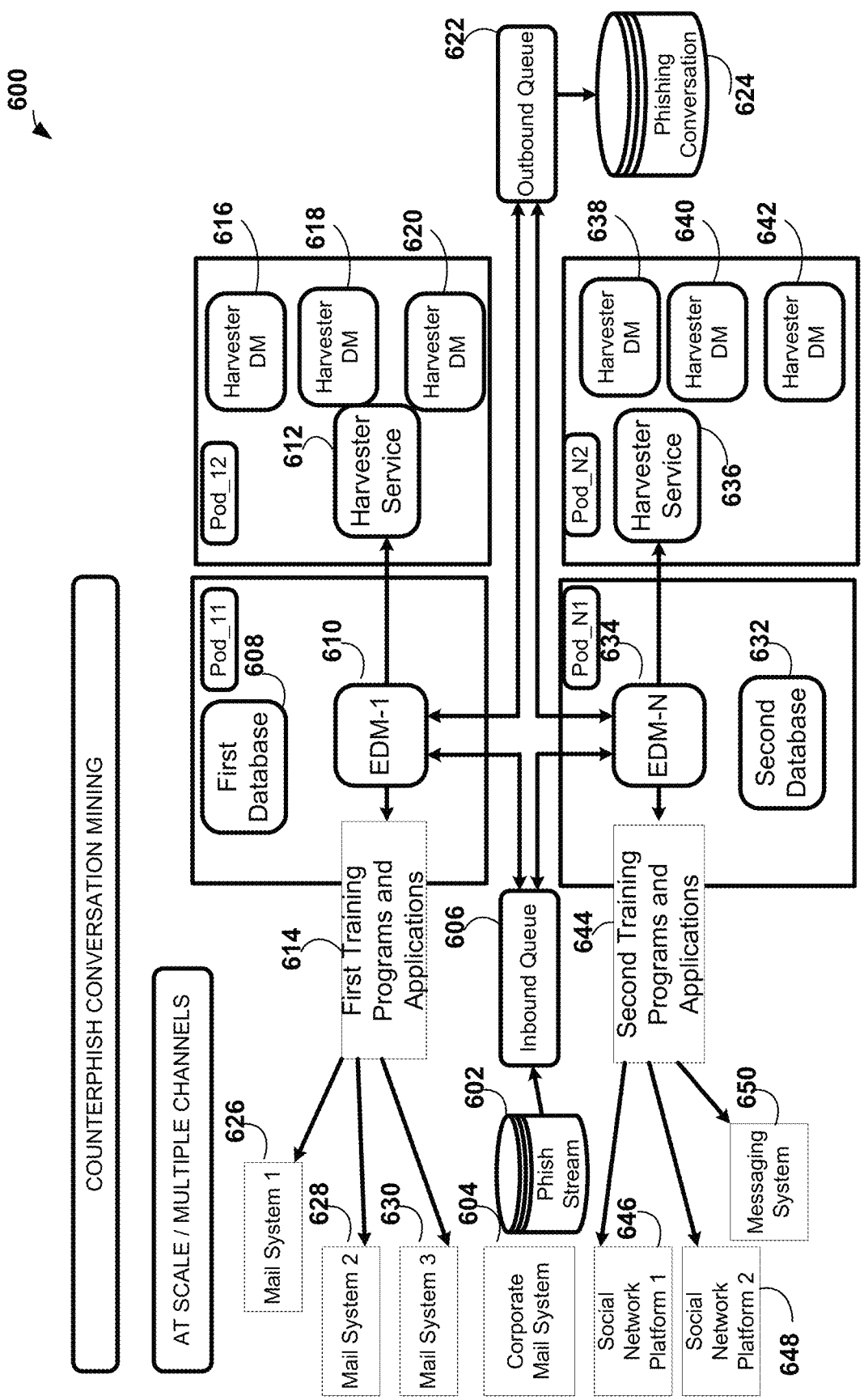
FIG. 6 illustrates an example security awareness conversation mining, in accordance with example embodiments.

FIG. 6 illustrates an example security awareness conversation mining 600, in accordance with example embodiments. For example, cloud servers may be used to deploy containers. In some embodiments, KUBERNETES® may be used to manage deployments at scale. For example, a first pod may be configured to manage an ensemble dialog manager (EDM) (e.g., EDM-1 610, EDM-N 634) and a second pod may be configured to manage a dialog model (e.g., harvester DMs 616, 618, 620, 638, 640, 642). In a live phishing context, conversation mining may be performed at scale and may be implemented as a harvesting service to perform conversation collection at scale, using an advanced counterphishing dialog engine, and an ensemble dialog manager. Generally, the EDM may be a front-end dialog component that manages a dialog. For example, in a live phishing scenario, a network administrator may be able to view and interact with (e.g., on a mobile device, a mobile application, via a neural link, and so forth) the EDM to identify and locate threats.

Some counterphishing scenarios may involve engaging in a deep dialog with the adversarial actor (or attacker or hostile actor) by deploying a synthetic persona dynamically during the electronic communication intended for the target user. The term "deep dialog" may generally refer to two or more rounds of electronic communication exchanges between the adversarial actor and the synthetic persona. The term "synthetic persona" as used herein generally refers to a synthetic user profile. In some aspects, the term "synthetic persona" may also refer to a synthetic bot associated with the synthetic user profile. As described herein, each round may be designed to elicit one or more attributes of the adversarial actor, extract one or more forensic signatures of the adversarial actor, reveal a conversational pattern of the adversarial actor, and so forth.

For example, EDMs (e.g., EDM-1 610, EDM-N 634) may orchestrate each independent conversation thread between an attacker and a selected dialog engine. The EDMs may take the candidate messages and send them to one or more dialog engines that engage the adversary (e.g., by pretending to take a bait). For example, the EDMs may deploy the one or more dialog engines to pivot the conversation to a SEA conversation with a synthetic persona. The EDMs can use multiple strategies to manage ongoing dialog threads with adversaries, and can integrate termination logic to halt threads that become non-active, and/or that have exceeded a maximum conversation length. In some embodiments, EDM may include a mode detector that detects a mode or a channel of the incoming phishing messages. For example, the mode detector can be configured to identify if a phishing message is an electronic mail, an instant message, a social interaction platform, etc. In some embodiments, the mode detector can be configured to identify a social interaction platform or software application that is a channel for the phishing message. In some embodiments, the mode detector can be configured to identify a language for the phishing message.

In some embodiments, the EDMs may deploy a hybrid model that includes pivoting between different channels, languages, social media platforms, and so forth, to engage the adversarial actor. Such a multi-channel strategy may include switching from an email to a post on a social networking platform, to an instant message, as some examples. Generally, any form of social media interaction, and/or any channel used for an SEA may be used for response and/or engagement strategies. In some embodiments, the EDMs may be configured to operate as a repository manager that collects attribute features that are reported by one or more dialog engines.

In order to train and deploy training system 500, counterphish conversation mining may be performed at scale during live phishing conversations 624 between phishers and conversation bots. For example, conversation bots may be trained to engage with live phishers by impersonating a target user. Generally, such conversation bots may have a logic similar to training bots 506. For example, training bots 506 may correspond to a conversation bot, and target trainees 504 may correspond to a phisher. However the roles may be different. In a phishing scenario, the conversation bots engage with a phisher to elicit information about the phisher. Such information may be used to generate a phishing playbook. However, in the training context, thousands of such engagements between conversation bots and phishers are used to generate training playbooks for training (e.g., training playbook 538, playbooks from conversation datasets 105, etc.). The term "phishing playbook" as used herein generally refers to a playbook associated with a phisher in the context of live phishing conversations 624 between phishers and conversation bots. The term "training playbook" as used herein generally refers to a playbook associated with a training programs and applications (e.g., first training programs and applications 614, second training programs and applications 644, etc.).

In the training scenario, training bots 506 may be configured to emulate a phisher and engage target trainees 504 to train them based on the training playbooks. Also, for example, a harvester dialog model (e.g., harvester DMs 616, 618, 620, 638, 640, 642) may play the role of dialog model 502A, and an ensemble dialog manager (e.g., EDM-1 610, EDM-N 634) may play the role of campaign management system 502B. State transitions similar to those described with reference to FIG. 5 may be used to mine conversations between conversation bots and phishers.

In some embodiments, phish stream 602 may include data for communication with corporate mail system 604. These communications may be placed in inbound queue 606 and are phishing messages that are to be harvested (e.g., to generate phishing playbooks). The messages may be mined for information from the phishers based on the phishing emails received in corporate mail system 604.

The messages from inbound queue 606 may be provided to a plurality of pairs of pods, Pod_11, Pod_12, . . . , Pod N1, Pod_N2. For example, first pod, Pod_11, of a first pair of pods may include first database 608, and EDM-1 610 that communicates with harvester service 612 and first training programs and applications 614. The second pod, Pod_12, of the pair of pods may include harvester service 612, and multiple harvester DMs 616, 618, 620. Harvester service 612 is configured to manage the multiple harvester dialog models 616, 618, 620. Ensemble dialog manager, EDM-1 610, provides dialogs to outbound queue 622 to send out messages as part of phishing conversations 624. First training programs and applications 614 receives data from EDM-1 610 and provides training via a plurality of mail systems, such as, for example, mail system 1 denoted as 626, mail system 2 denoted as 628, and/or mail system 3 denoted as 630.

Similarly, to pair of pods, Pod_11, Pod_12, phishing messages in inbound queue 606 may be provided to another pair of pods, Pod_N1, Pod_N2. For example, Pod_N1, may include second database 632, and ensemble dialog manager EDM-N 634 that communicates with harvester service 636 and second training programs and applications 644. Also, for example, Pod_N2 may include harvester service 636, and multiple harvester DMs 638, 640, 642. Harvester service 636 may manage the multiple harvester dialog models 638, 640, 642. Ensemble dialog manager, EDM-N 634, provides dialogs to outbound queue 622 to send out messages as part of phishing conversations 624. Second training programs and applications 644 receives data from EDM-N 634 and provides training via a plurality of platforms, such as, for example, social network platform 1 denoted as 646, social network platform 2 denoted as 648, and/or messaging system 650.

Generally speaking, EDMs (e.g., EDM-1 610, EDM-N 634) in a first pod of a pair of pods (e.g., Pod_11, Pod_N1) may initiate a dialogue engine (e.g., harvester DMs 616, 618, 620, 638, 640, 642) in a second pod of the pair of pods (e.g., Pod_12, Pod_N2). Generally, a number of harvester DMs to be deployed may depend on a number of phishing conversations to be managed. The EDMs (e.g., EDM-1 610, EDM-N 634) may select a dialogue engine (e.g., harvester DMs 616, 618, 620, 638, 640, 642) and provide a phishing message for a phishing conversation. The harvester DMs may generate information based on the phishing conversation, and such information may be provided back to the EDMs. The EDMs in turn may send a message to outbound queue 622. Phishing conversation 624 is a database that captures and stores the plurality of phishing conversations and information related to the phishing conversations. First database 608 and second database 632 may be internal thread databases that cache the phishing conversations and the state information that each harvester DM maintains.

The harvester services (e.g., harvester service 612, harvester service 636) may be stateless. The EDMs may provide the respective harvester services the next message for a respective phishing thread and a current state, and then the harvester services may read the current state of the conversation, review the next inbound message from the phisher, and formulate the next message. The next message may be provided back to the respective EDMs and then proceed onto the next phisher conversation, and/or to a next reply in a phishing conversation.

Example Machine Learning Models

Figure 7:
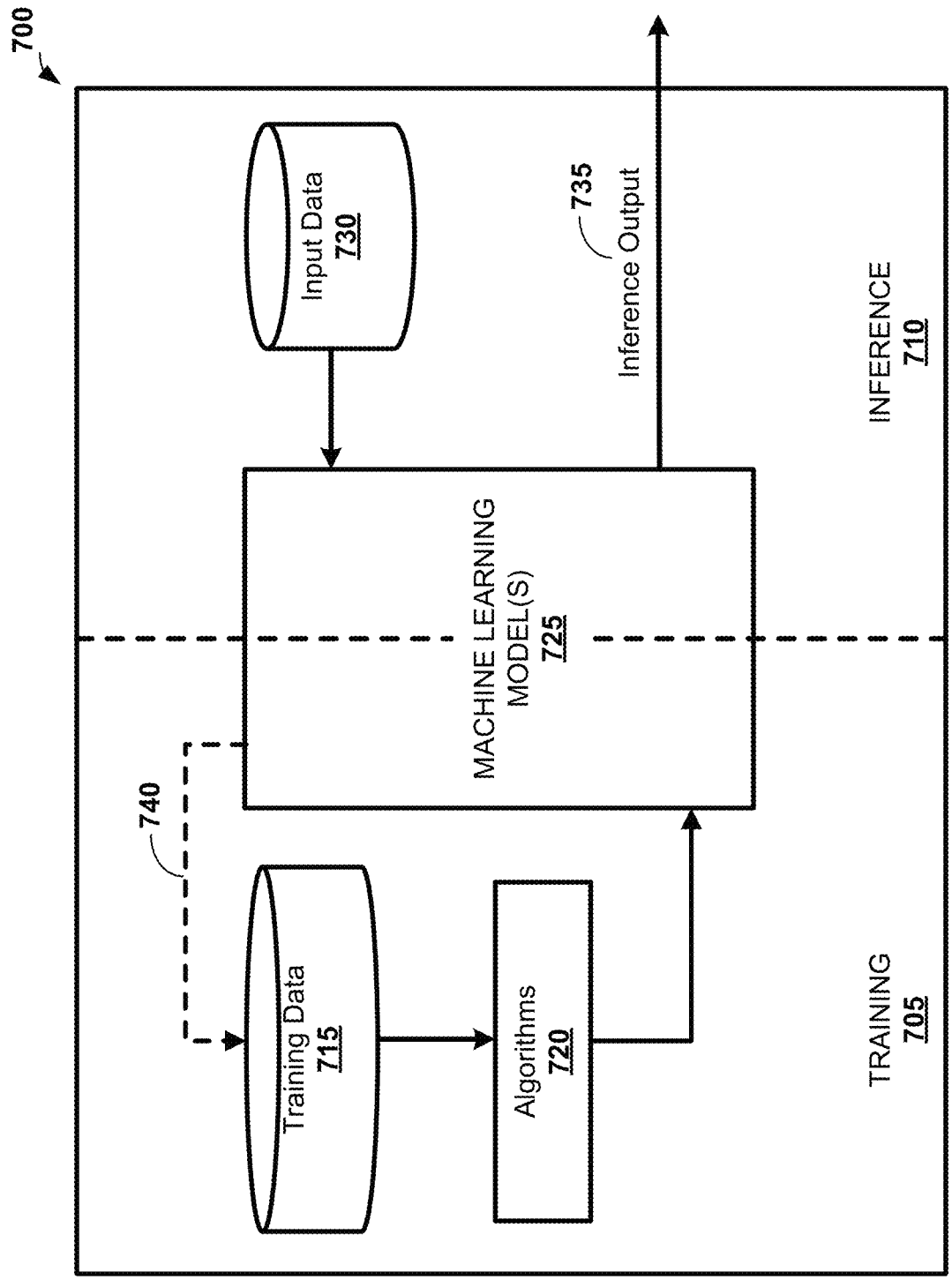
FIG. 7 is a block diagram illustrating training and inference phases for an example machine learning model, in accordance with example embodiments.

FIG. 7 is a block diagram 700 illustrating training and inference phases for an example machine learning model, in accordance with example embodiments. As described herein, one or more machine learning models may be trained and deployed to perform the tasks.

Block diagram 700 includes a training phase 705 and an inference phase 710. Generally, machine learning models 725 are trained during the training phase 705 by using training data 715. In some embodiments, machine learning models may be trained by utilizing one or more machine learning algorithms 720 that are applied to training data 715 to recognize patterns in the input data 730 and produce the inference output 735. Training data 715, the one or more algorithms 720, or both, may depend on a particular machine learning model, its expected functionality, a desired precision, a desired efficiency, a desired accuracy, available computing resources, and so forth. During the inference phase 710, the trained machine learning models 725 receive input data 730 and generate predictions or an inference output 735 about input data 730.

In some embodiments, training data 715 may comprise multiple customer chat sessions. In some embodiments, such chat sessions may be labeled as positive or negative examples based on whether the chat session was helpful in assisting the customer. Also, for example, the chat sessions may be used to train a conversation bot to engage in a conversation that can mimic a live assistant.

In some embodiments, training data 715 may include a plurality of conversational patterns from a respective plurality of dialogs with one or more adversarial actors. Such data may be used to design training playbooks that enable a conversation bot to engage in a conversation that can mimic a live phisher. A given conversational pattern of the plurality of conversational patterns may include one or more dialog interaction elements utilized by the one or more adversarial actors during a respective dialog of the plurality of dialogs.

As described herein, inference output 735 may include a label associated with an incoming message (based on a trained classifier). Also, for example, inference output 735 may include a predicted training playbook model. In some embodiments, inference output 735 may include an automated response to an incoming message. In some embodiments, inference output 735 may include generating conversation threads, forensic signatures, and so forth.

Algorithms 720 may include, but are not limited to artificial neural networks (e.g., convolutional neural networks, recurrent neural networks), a Bayesian network, a hidden Markov model, a Markov decision process, a logistic regression function, a support vector machine, a statistical machine learning algorithm, and/or a heuristic machine learning system. Algorithms 720 may involve supervised, unsupervised, semi-supervised, and/or reinforcement learning techniques. Machine learning models 725 may involve natural language processing (NLP), natural language understanding (NLU), natural language generation (NLG), or any combination thereof. In some embodiments, machine learning models 725 may be updated based on the inference phase 710, and training data 715 may be updated via feedback loop 740.

In some embodiments, machine learning models 725 and/or algorithms 720 may be located within one computing device, or in a shared computing environment (e.g., computing environment 1000). In some embodiments, machine learning models 725 and/or algorithms 720 may be a part of a distributed computing architecture, such as one or more cloud servers. Also, for example, machine learning models 725 and/or algorithms 720 may be located within an organization, such as a cybersecurity framework for an organization. In some embodiments, the training phase 705 of the one or more machine learning models 725 may be performed at a computing device that is different from a computing device where inference phase 710 is performed. Also, for example, input data 730 may be received at a first computing device, and provided to a second computing device that houses trained machine learning models 725. The second computing device may then apply machine learning models 725 to input data 730, and generate inference output 735. Subsequently, inference output 735 may be provided to the first computing device.

Generally, one or more components of FIG. 7 may be available as a platform, as an application programming interface (API), an application-specific integrated circuit (ASIC), as a service (e.g., Software as a Service (SaaS), Machine Learning as a Service (MLaaS), Analytics as a Service (AnaaS), Platform as a Service (PaaS), Knowledge as a Service (KaaS), Network Defense as a Service (NDaaS)), and so forth.

Figure 8:
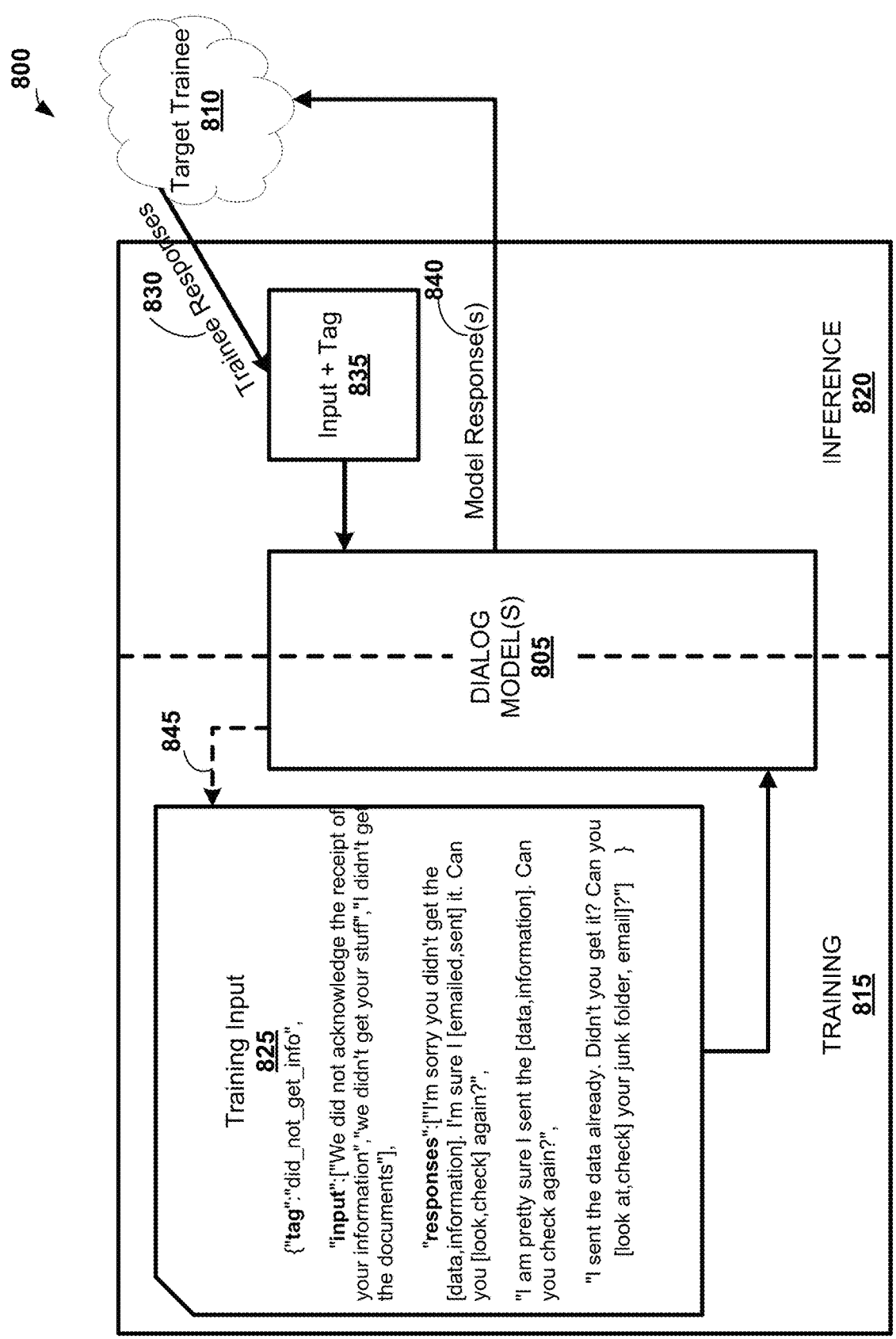
FIG. 8 illustrates a diagram illustrating training and inference phases for example dialog models, in accordance with example embodiments.

FIG. 8 depicts a diagram 800 illustrating training and inference phases for example dialog models 805, in accordance with example embodiments. Dialog models 805 can be configured to intelligently communicate via multiple modes (e.g., email, SMS, and other forums such as social messaging forums like META®, TWITTER®, and so forth) in multiple rounds, while training a target trainee, and eliciting information from the target trainee. Dialog models 805 may be NLP, NLU, NLG, or a combination thereof. Dialog models 805 may also be trained to extract information from an electronic communication. Dialog models 805 can also be used as a business chatbot or virtual assistant that is trained on a company's information and that can be configured to answer questions and provide expert help.

Conversation bots can be trained to recognize words and/or phrases in an incoming message, and generate a response based on the detected words and/or phrases. As described herein, dialog models 805 may be based on Semantic Text Similarity (STS) to determine an individual's intent characteristic from one or more messages and generate the responses to those messages based on the detected intent characteristic. For example, dialog models 805 may be trained to recognize whether a message includes a question or a statement, infer a mood, detect an urgency, deduce a sentiment, and so forth. For example, social and emotional intelligence features may be incorporated to respond with a different "tone" if a target trainee 810 becomes angry or pulls back from the conversation. Such features may include indicators based on latent attributes, message identifiers associated with a thematic label, and/or sentiment analysis.

In some embodiments, social and emotional intelligence features may be used to assemble a phishing playbook of an adversarial actor, and/or a training playbook designed to engage the target trainee 810. The social and emotional intelligence features may include indicators of urgency, flattery, hostility, threat, profanity, and so forth. In some embodiments, common themes in messages at later rounds of conversations may be detected. Such themes may be used in the ML models described herein.

As indicated, in the training phase 815, dialog models 805 may be trained based on training input 825 (e.g., JSON training input) which may include a status identifier, an input phrase, and one or more responses. For example, a status identifier may be a phrase "did_not_get_info." An input phrase may be a phrase in an incoming message, such as, "we did not acknowledge the receipt of your information," or "we didn't get your stuff," or "I didn't get the documents," and so forth. The status identifier and the input phrase may be associated with one or more responses such as, for example, "I'm sorry you didn't get the [data, information]" or "I'm sure I [emailed, sent] it. Can you [look, check] again?" or "I am pretty sure I sent the [data, information]. Can you check again?" or "I sent the data already. Didn't you get it? Can you [look at, check] your junk folder, email]?", and so forth.

As described herein, dialog models 805 may be trained based on a message embedding with an 'input phrase' referenced by a 'status identifier'. In the inference phase 820, when trainee responses 830 are received from target trainee 810, the message may be analyzed at block 835 to extract a phrase and a status identifier. Dialog models 805 may apply STS to identify a semantic similarity to the trained input 825. In some embodiments, a similarity score to the phrase may be measured on a scale from 0 and 1. Based on the similarity score, a strength of the semantic similarity may be determined, and dialog models 805 may output a model response 840. Similar techniques may be utilized to determine social and emotional intelligence to determine an optimal response. In some embodiments, selection of a model response 840 may be a random choice among candidate responses.

As an example, trainee responses 830 may be processed to detect a phrase, "we didn't get your article" or "your information was missing." Dialog models 805 may determine that the phrase is semantically similar to the intent represented by a training input "did_not_get_info". Accordingly, dialog models 805 may generate a response, "I am pretty sure I sent the information. Can you check again?". Generally, a system trained to detect specific keywords and/or key phrases would likely not be able to respond intelligently to trainee responses 830. Feedback loop 845 may update training input 825 based on predictions by dialog models 805 during inference phase 820.

In some embodiments, dialog models 805 may utilize slot filling to add relevant information from databases to the response. For example, in a response, "My cell is %_cell_number," dialog models 805 may retrieve the cell phone number to be "535-333-1212," and subsequently insert the retrieved number into the response, "My cell is 535-333-1212."

In some embodiments, dialog models 805 may utilize macros to allow multiple ways to modify the response. For example, the response "[I am, We are] going to [fly, drive] to the [conference, party, meeting, celebration]" can output multiple responses: "I am going to fly to the conference," "We are going to drive to the meeting," "We are going to fly to the party," and so forth. In some embodiments, the responses can be modulated based on the ongoing conversation, historical information about a trainee's preferences, an existing training playbook, a gender, religion, or other characteristic of the trainee, the intended target, or both. Also, for example, synthetic persona may be tailored based on one or more characteristics, including, but not limited to, a type of attacker, a type of target, a type of enterprise, a type of channel, a type of conversation (romantic, business, religious), a language, a training playbook, and so forth. In some embodiments, a training program may be designed based on the trained plurality of synthetic persona.

In some embodiments, dialog models 805 may identify and/or extract information from the messages (e.g. names, organizations, dates, locations, addresses, and so forth) by using various forms of NLP and regular expression (RegEx).

In some embodiments, dialog models 805 may utilize training playbooks that allow a subject matter expert (SME) to ask for information in a particular order, and/or to change a direction of the conversation if the target trainee 810 answers one way or another. For example, dialog models 805 may predict a model response 840, such as, "Do you research Covid?" If the incoming trainee responses 830 from target trainee 810 is a "No," then dialog models 805 may generate a new model response 840 that states, "Thank You," and dialog models 805 may exit the conversation. However, if the incoming trainee responses 830 from target trainee 810 is a "Yes," then dialog models 805 may continue the conversation and ask more questions based upon the training playbooks (e.g. the training playbook's next directive may be "Ask for Phone" and dialog models 805 may generate a new model response 840, such as, "Can I get your number to ask you more questions?."

Similar techniques may be applied to business applications where a pre-processor may read a document (e.g. Human Resources (HR) information, legal documents, medical documents, and so forth), and train dialog models on that message with STS allowing users to ask questions about that information, so that dialog models may provide responses to such queries.

Example Networking Environment

Figure 9:
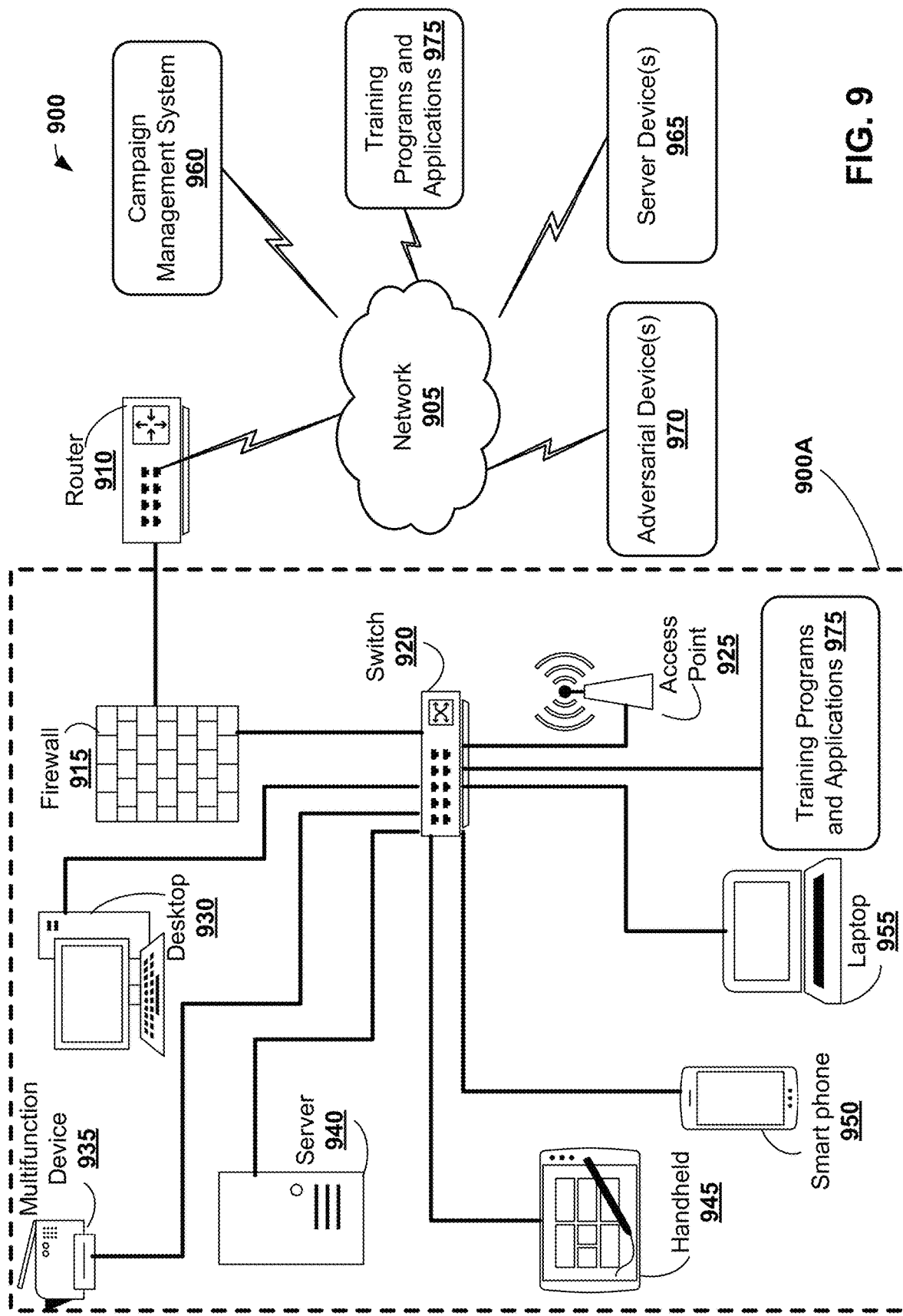
FIG. 9 illustrates a network environment for a security awareness training system, in accordance with example embodiments.

FIG. 9 illustrates a network environment 900 for a security awareness training system, in accordance with example embodiments. Network environment 900 includes network 905, campaign management system 960, server device(s) 965, and adversarial device(s) 970, training programs and applications 975, that are configured to communicate, via network 905, with an enterprise system 900A that includes one or more devices such as a desktop 930, a training device 935, a server 940, a handheld device 945, a smart phone 950, a laptop 955, and/or a neural link device (not shown).

Network 905 may correspond to a local area network (LAN), a wide area network (WAN), a WLAN, a WWAN, a corporate intranet, the public Internet, or any other type of network configured to provide a communications path between networked computing devices. Network 905 may also correspond to a combination of one or more LANs, WANs, corporate intranets, and/or the public Internet.

The network environment 900 may include tens, hundreds, or thousands of devices. In some examples, the one or more devices can be directly connected to network 905. Also, for example, network environment 900 may include tens, hundreds, or thousands of enterprise systems similar to 900A, corresponding to different organizations. In other examples, the devices can be indirectly connected to network 905 via router 910, firewall 915, network switch 920, and/or access point 925. In this example, router 910, firewall 915, network switch 920, and/or access point 925 can act as an associated computing device to pass electronic communications between the one or more devices and network 905. Although an example physical topology of network 905 is illustrated in FIG. 9, it is understood that network 905 may be associated with a logical topology for data flow between physical components of network 905.

Router 910 can be configured to transmit packets by processing routing information included in a packet (e.g., Internet protocol (IP) data from layer 3). The routing information can be processed via a routing table. Firewall 915 is a network device that can be configured to control network security and access rules. Network switch 920 can be a single switch or an array of switches. Network switch 920 is a network device that can be configured to connect various devices on a network, such as, for example, desktop 930, training device 935, server 940, handheld device 945, smart phone 950, a laptop 955, and/or a neural link device (not shown). Network switch 920 can use packet switching to receive and forward data between devices in a network. Access point 925 is a network device that can be configured to provide wireless access to various devices on the network.

Server device(s) 965 can be configured to perform one or more services, as requested by the one or more devices. For example, server device(s) 965 can provide content to the one or more devices. The content can include, but is not limited to, content available over the World Wide Web (WWW), content from a dedicated server, software (e.g., a messaging application, a social media platform, an electronic mail application, and so forth), images, audio, and/or video. The content can include confidential information. Although server 940 is shown as a single server, it can represent a plurality of servers, and/or a data center comprising a plurality of servers.

In some embodiments, enterprise system 900A may include a countermeasure system (not shown) that can be a monitoring and/or management device that monitors and/or manages communications received by devices in enterprise system 900A for potential attacks by an adversarial device(s) 970. For example, a messaging application (e.g., an email application) may be installed in one or more devices (e.g., desktop 930, a training device 935, a server 940, a handheld device 945, a smart phone 950, a laptop 955, and/or a neural link device (not shown)), and server 940 may communicate with server device(s) 965 to provide the email messaging service. For example, enterprise system 900A may include training programs and applications 975 that are a suite of training programs and/or applications that are used to deliver training using a plurality of bots that deliver training to training subjects via a plurality of devices (e.g., desktop 930, a training device 935, a server 940, a handheld device 945, a smart phone 950, a laptop 955, and/or a neural link device (not shown)). Training programs and applications 975 collect training related data and provide this data to campaign management system 960. Training programs and applications 975 may be may be a distributed system with various components in one or more organizations. Training programs and applications 975 may be distributed as a front-end component and a back-end component. For example, a front-end may provide training to individuals at a particular organization, whereas a back-end develops training, updates training bots, provides data to campaign management system 960, coordinates and/or manages multiple training modules at multiple organizations.

The countermeasure system may initiate a conversation with adversarial device(s) 970 by deploying one or more synthetic persona, generate forensic signatures, detect phishing playbook models, generate notifications and/or alerts. In some embodiments, countermeasure system may deploy one or more synthetic persona within an organization. For example, when a target user within an organization receives a malicious message from an adversarial actor, countermeasure system may generate a synthetic persona, for example, to emulate the target user, and engage the adversarial actor in a conversation. In some embodiments, countermeasure system may include a mapping (e.g., an IMAP) of a message inbox to monitor, manage, and/or respond to cyber security threats.

In some embodiments, enterprise system 900A may include a campaign management system 960. In some embodiments, campaign management system 960 may be located within a computing environment of an enterprise system. For example, campaign management system 960 may be a component of an organization's threat detection infrastructure. In some embodiments, campaign management system 960 may be utilized to train and/or update employees of an organization, and/or various components. For example, based on one or more training playbooks, campaign management system 960 may be used to train individuals to detect future attacks from adversarial actors that may deploy one or more detected phishing playbooks. Also, for example, campaign management system 960 may be used to develop programs and/or train personnel at an organization based on one or more training playbooks. Such training programs may be available online, on-demand and/or in-person. Also, for example, training programs may be tailored to a particular organization. In some embodiments, campaign management system 960 may emulate an adversarial actor for training purposes and/or as part of a security maintenance check for an organization.

In some embodiments, campaign management system 960 may be a distributed system with various components in one or more organizations that may be monitoring their networks, applications, and so forth. Also, for example, campaign management system 960 may be a distributed system including various components such as an alert system, a notification system, a message archival system, a message retrieval system, various components of machine learning models, and so forth. In some embodiments, campaign management system 960 may include a central server (e.g., a cloud server) that manages the various components of campaign management system 960.

In some embodiments, campaign management system 960 may be distributed as a front-end component and a back-end component. For example, a network administrator may be able to view and interact with (e.g., on a mobile device, a mobile application, and so forth) the campaign management system 960 to manage training. Also, for example, a machine learning based processing engine may be a part of a back-end component.

In some embodiments, campaign management system 960 may be in communication with other systems or organizations that are involved in threat protection, cybersecurity, cyber defense, and so forth. For example, campaign management system 960 may obtain information about real and/or perceived hostile activities from various organizations, and may update and/or train its models based on that. For example, campaign management system 960 may receive data indicating an increase in a phishing activity originating in a certain geographic region, and may update a training bot, and/or one or more machine learning models accordingly.

Campaign management system 960, or one or more components thereof, may be provided as a service, such as for example, Software as a Service (Saas), Machine Learning as a Service (MLaaS), Analytics as a Service (AnaaS), Platform as a Service (PaaS), Knowledge as a Service (KaaS), Network Defense as a Service (NDaaS), among others.

Example Computing Environment

Figure 10:
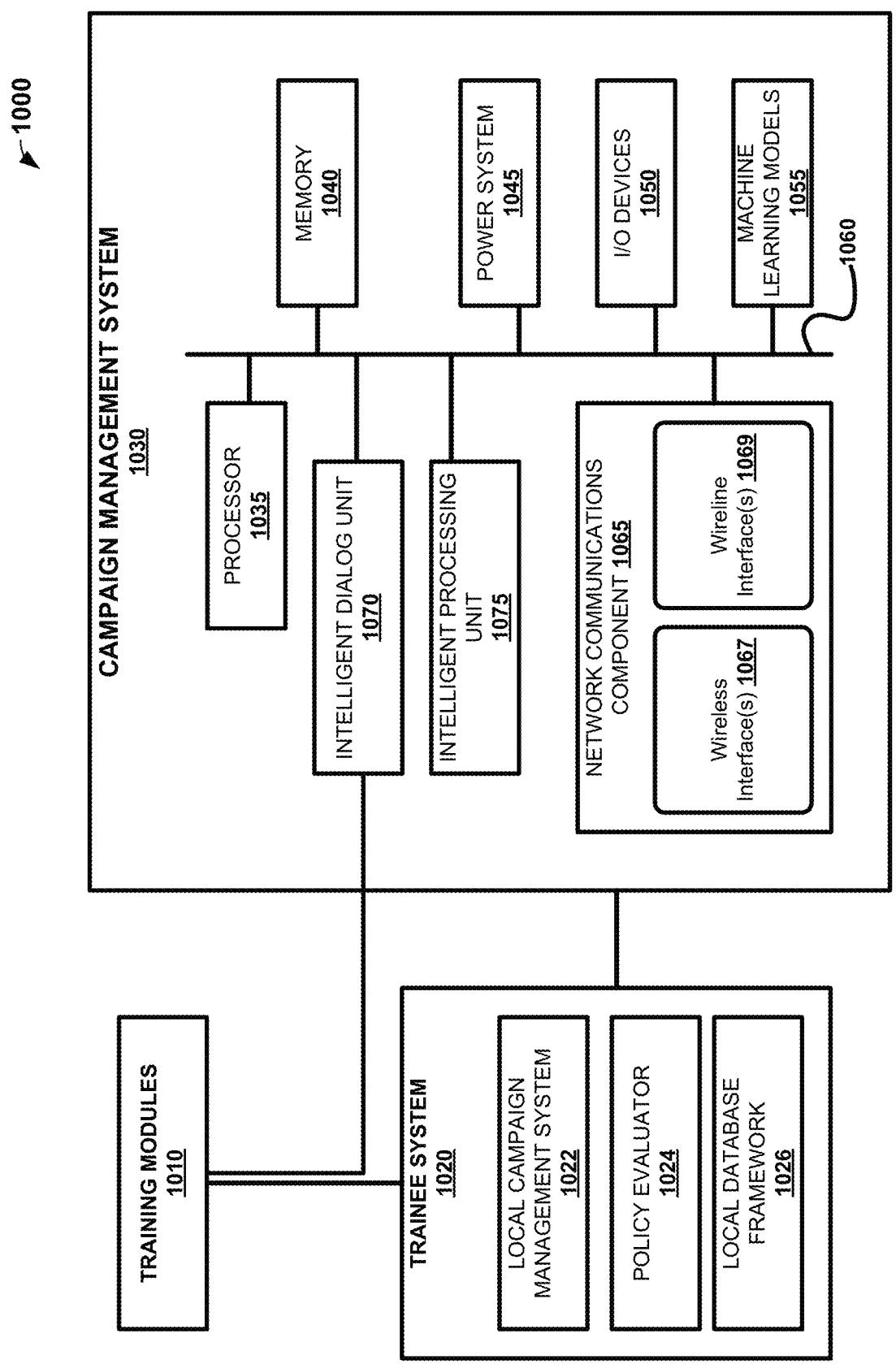
FIG. 10 is a block diagram illustrating an example computing environment for a security awareness training system, in accordance with example embodiments.

FIG. 10 is a block diagram illustrating an example computing environment for a security awareness training system, in accordance with example embodiments. In particular, computing environment 1000 shown in FIG. 10 can be configured to perform at least one function of and/or related to security awareness training.

Computing environment 1000 may include training module(s) 1010 (likely to be a simulated hostile actor that sends phishing emails and other malicious communications), trainee system 1020 (such as enterprise system 900A of FIG. 9 where one or more users are a target of messages from training module(s) 1010), and campaign management system 1030 that designs, manages, and/or delivers one or more training campaigns. Campaign management system 1030 can include one or more processors 1035, memory 1040, power system 1045, input/output devices 1050, and network communications component 1065, which may be linked together via a system bus, network, or other connection mechanism 1060.

For example, campaign management system 1030 may include an intelligent dialog unit 1075, which may perform operations similar to dialog model 502A of FIG. 5, dialog model 805 of FIG. 8, and so forth. As another example, campaign management system 1030 may include an intelligent processing unit 1075, which may perform operations similar to a machine learning based processing engine. Campaign management system 1030 also includes machine learning model(s) 1055, which may perform operations similar to machine learning models described with reference to FIGS. 7 and/or 8.

One or more processors 1035 can include one or more general purpose processors, and/or one or more special purpose processors (e.g., digital signal processors, graphics processing units (GPUs), application specific integrated circuits, etc.). One or more processors 1035 can be configured to execute computer-readable instructions that are contained in memory 1040 and/or other instructions as described herein.

Memory 1040 can include one or more non-transitory computer-readable storage media that can be read and/or accessed by at least one of one or more processors 1035. The one or more computer-readable storage media can include volatile and/or non-volatile storage components, such as optical, magnetic, organic or other memory or disc storage, which can be integrated in whole or in part with at least one of one or more processors 1035. In some examples, memory 1040 can be implemented using a single physical device (e.g., one optical, magnetic, organic or other memory or disc storage unit), while in other examples, memory 1040 can be implemented using two or more physical devices.

Power system 1045 can include one or more batteries and/or one or more external power interfaces for providing electrical power to campaign management system 1030. One or more external power interfaces of power system 1045 can include one or more wired-power interfaces, such as a USB cable and/or a power cord, that enable wired electrical power connections to one or more power supplies that are external to campaign management system 1030.

Input/output (I/O) devices 1050 may include storage devices, a receiver, a transmitter, a speaker, a display, an image capturing component, an audio recording component, a user input device (e.g., a keyboard, a mouse, a microphone), and so forth. Although not shown in FIG. 10, one or more of I/O devices 1050 may be a device external to campaign management system 1030. Such an external device may communicate with campaign management system 1030 via a wired or wireless connection, and such communication may be facilitated by an I/O interface of campaign management system 1030. In some embodiments, I/O devices 1050 may include devices that display a training program or application.

Network communications component 1065 can include one or more devices that provide one or more wireless interfaces 1067 and/or one or more wireline interfaces 1069 that are configurable to communicate via a network. Wireless interface(s) 1067 can include one or more wireless transmitters, receivers, and/or transceivers, such as a Bluetooth™ transceiver, a Wi-Fi™ transceiver, an LTE™ transceiver, and/or other type of wireless transceiver configurable to communicate via a wireless network, such as, for example, a brain/neural interface. Wireline interface(s) 1069 can include one or more wireline transmitters, receivers, and/or transceivers, such as an Ethernet transceiver, a Universal Serial Bus (USB) transceiver, or similar transceiver configurable to communicate via a physical connection to a wireline network.

Network communications component 1065 can be configured to provide reliable, secured, and/or authenticated communications between various components. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information). Communications can be made secure (e.g., be encoded or encrypted) and/or decrypted/decoded using one or more cryptographic protocols and/or algorithms, such as, but not limited to, a secure sockets protocol such as Secure Sockets Layer (SSL), and/or Transport Layer Security (TLS).

Computing environment 1000 can include trainee system 1020. In some implementations, trainee system 1020 can include local campaign management system 1022, policy evaluator 1024, and/or local database framework 1026. Local campaign management system 1022 may perform operations similar to campaign management system 440 of FIG. 4, campaign management system 502B of FIG. 5, and so forth, and may be local to the trainee system 1020 (e.g., local to a target trainee, and/or local to an organization).

Policy evaluator 1024 can be configured to evaluate and/or implement corporate policies related to local campaign management system 1022. In some embodiments, policy evaluator 1024 may implement policies based on feedback from campaign management system 1030.

Although local campaign management system 1022 and policy evaluator 1024 are shown as distinct components of trainee system 1020, this is for illustrative purposes only. In some embodiments, local campaign management system 1022 and policy evaluator 1024 can be a single component. In some implementations, local campaign management system 1022 and policy evaluator 1024 can be housed in two separate physical devices.

In some embodiments, trainee system 1020 can include local database framework 1026. Local database framework 1026 can be configured to include data related to training module(s) 1010. In some aspects, local database framework 1026 can be configured to perform one or more operations performed by campaign database framework 306 of FIG. 3, centralized campaign database 415 of FIG. 4, and so forth.

Example Methods of Operation

FIG. 11 illustrates an example method 1100, in accordance with example embodiments. Method 1100 may include various blocks or steps. The blocks or steps may be carried out individually or in combination. The blocks or steps may be carried out in any order and/or in series or in parallel. Further, blocks or steps may be omitted or added to method 1100.

The blocks of method 1100 may be carried out by various elements of campaign management system 1000 as illustrated and described in reference to FIG. 10.

Block 1110 includes generating a training playbook based on a plurality of conversational patterns from a respective plurality of dialogs between non-human synthetic persona with an adversarial actor, wherein a given conversational pattern of the plurality of conversational patterns comprises one or more dialog interaction elements utilized by the adversarial actor during a respective dialog of the plurality of dialogs.

Block 1120 includes configuring a dialog model for a second synthetic persona to engage in a training dialog with a target trainee to train the target trainee to detect, avoid and/or mitigate a future attack by the adversarial actor, wherein the dialog model is configured to emulate the future attack by the adversarial actor by utilizing the training playbook.

Block 1130 includes outputting the training playbook.

In some embodiments, the configuring of the dialog model involves training the dialog model based on one or more of natural language processing (NLP), natural language understanding (NLU), or natural language generation (NLG).

In some embodiments, the configuring of the dialog model may be based on one or more of a type of adversarial actor, a type of target trainee, a type of enterprise organization, a mode of communication, a type of conversation, a language, or a known dialog interaction strategy of a known training playbook.

Some embodiments involve deploying the second synthetic persona to engage in the training dialog with the target trainee.

Some embodiments involve determining an information content to be obtained from the target trainee. Such embodiments also involve formulating, based on the information content to be obtained from the target trainee, a next inquiry to be sent to the target trainee. Such embodiments additionally involve providing, by the dialog model, the next inquiry to the target trainee.

Some embodiments involve determining, during the training dialog, an intent characteristic in an incoming message from the target trainee. Such embodiments also involve formulating, based on the intent characteristic, a next inquiry to be sent to the target trainee. Such embodiments additionally involve providing, by the dialog model, the next inquiry to the target trainee.

Some embodiments involve determining a message count of the training dialog. Such embodiments also involve determining whether the message count exceeds a message threshold. Such embodiments additionally involve terminating the training dialog upon a determination that the message count exceeds the message threshold.

Some embodiments involve determining a duration of the training dialog. Such embodiments also involve determining whether the duration exceeds a duration threshold. Such embodiments additionally involve terminating the training dialog upon a determination that the duration exceeds the duration threshold.

Some embodiments involve obtaining, from the training dialog, one or more attributes related to the target trainee. Such embodiments also involve determining whether an attribute count of the one or more attributes exceeds an attribute threshold. Such embodiments additionally involve terminating the training dialog upon a determination that the attribute count exceeds the attribute threshold.

In some embodiments, the training dialog may be performed via an initial mode of communication. Such embodiments involve pivoting to another mode of communication during the training dialog.

Some embodiments involve generating a data structure comprising information associated with one or more target trainees, respective second synthetic persona, respective training playbooks, and respective sequence specifiers, wherein a given sequence specifier of the respective sequence specifiers indicates an order in which the respective second synthetic persona and the respective training playbook are to be implemented to train a respective target trainee of the one or more target trainees.

Some embodiments involve identifying, based on one or more target-persona pairing attributes comprising an identity of the target trainee, an identity of the second synthetic persona, and one or more training parameters, a previously generated training playbook. Such embodiments additionally involve initializing, based on the identified training playbook, a respective dialog model to engage in the training dialog with the target trainee. Such embodiments also involve deploying the second synthetic persona to engage in the training dialog with the target trainee.

Some embodiments involve determining a rate of engagement associated with the dialog model, wherein the rate of engagement is indicative of a success rate of the dialog model in the engaging in the training dialog with the target trainee. A future deployment of the dialog model may be based on the rate of engagement.

In some embodiments, the configuring of the dialog model involves applying natural language processing to extract one or more flags from an incoming message from the target trainee. Such embodiments also involve performing automated next inquiry formulation to send a next inquiry to the target trainee. Such embodiments additionally involve applying a natural language answering engine to generate an outgoing message based on the next inquiry formulation. Such embodiments also involve sending, by the dialog model, the outgoing message to the target trainee.

Some embodiments involve determining whether an amount of elapsed time since a last outgoing message exceeds a waiting time threshold. Such embodiments also involve, upon a determination that the amount of elapsed time exceeds the waiting time threshold, causing the dialog model to send another outgoing message to the target trainee.

In some embodiments, the training playbook may include one or more playbook elements. The one or more playbook elements may include an introduction method, an inquiry method, a subdialog management, a conditional dialog management, a schedule control, branch discussion handling, custom knowledge extraction, and/or termination criteria.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information and/or comparison of signals can correspond to circuitry that can be configured to perform the specific logical functions of a herein-described method or technique. Alternatively or additionally, a step or block that represents a processing of information and/or comparison of signals can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting.

What is claimed is:

1. A computer-implemented method for creating a training playbook to train a potential target of social engineering against an attack by an adversarial actor, comprising:
    generating a training playbook based on a plurality of conversational patterns from a respective plurality of dialogs between non-human synthetic persona with the adversarial actor, wherein a given conversational pattern of the plurality of conversational patterns comprises one or more dialog interaction elements utilized by the adversarial actor during a respective dialog of the plurality of dialogs;
    configuring a dialog model for a second synthetic persona to engage in a training dialog with a target trainee to train the target trainee to detect, avoid and/or mitigate a future attack by the adversarial actor, wherein the dialog model is configured to emulate the future attack by the adversarial actor by utilizing the training playbook; and
    outputting the training playbook.

2. The computer-implemented method of claim 1, wherein the configuring of the dialog model comprises training the dialog model based on one or more of natural language processing (NLP), natural language understanding (NLU), or natural language generation (NLG).

3. The computer-implemented method of claim 1, wherein the configuring of the dialog model is based on one or more of a type of adversarial actor, a type of target trainee, a type of enterprise organization, a mode of communication, a type of conversation, a language, or a known dialog interaction strategy of a known training playbook.

4. The computer-implemented method of claim 1, further comprising:
    deploying the second synthetic persona to engage in the training dialog with the target trainee.

5. The computer-implemented method of claim 4, further comprising:
    determining an information content to be obtained from the target trainee;
    formulating, based on the information content to be obtained from the target trainee, a next inquiry to be sent to the target trainee; and
    providing, by the dialog model, the next inquiry to the target trainee.

6. The computer-implemented method of claim 4, further comprising:
    determining, during the training dialog, an intent characteristic in an incoming message from the target trainee;
    formulating, based on the intent characteristic, a next inquiry to be sent to the target trainee; and
    providing, by the dialog model, the next inquiry to the target trainee.

7. The computer-implemented method of claim 4, further comprising:
    determining a message count of the training dialog;
    determining whether the message count exceeds a message threshold; and
    terminating the training dialog upon a determination that the message count exceeds the message threshold.

8. The computer-implemented method of claim 4, further comprising:
    determining a duration of the training dialog;
    determining whether the duration exceeds a duration threshold; and
    terminating the training dialog upon a determination that the duration exceeds the duration threshold.

9. The computer-implemented method of claim 4, further comprising:
    obtaining, from the training dialog, one or more attributes related to the target trainee;
    determining whether an attribute count of the one or more attributes exceeds an attribute threshold; and
    terminating the training dialog upon a determination that the attribute count exceeds the attribute threshold.

10. The computer-implemented method of claim 4, wherein the training dialog is performed via an initial mode of communication and further comprising:
    pivoting to another mode of communication during the training dialog.

11. The computer-implemented method of claim 4, further comprising:
    generating a data structure comprising information associated with one or more target trainees, respective second synthetic persona, respective training playbooks, and respective sequence specifiers, wherein a given sequence specifier of the respective sequence specifiers indicates an order in which the respective second synthetic persona and the respective training playbook are to be implemented to train a respective target trainee of the one or more target trainees.

12. The computer-implemented method of claim 1, further comprising:
    identifying, based on one or more target-persona pairing attributes comprising an identity of the target trainee, an identity of the second synthetic persona, and one or more training parameters, a previously generated training playbook;

initializing, based on the identified training playbook, a respective dialog model to engage in the training dialog with the target trainee; and deploying the second synthetic persona to engage in the training dialog with the target trainee.

13. The computer-implemented method of claim 1, further comprising:

determining a rate of engagement associated with the dialog model, wherein the rate of engagement is indicative of a success rate of the dialog model in the engaging in the training dialog with the target trainee, and wherein a future deployment of the dialog model is based on the rate of engagement.

14. The computer-implemented method of claim 1, wherein the configuring of the dialog model further comprises:

applying natural language processing to extract one or more flags from an incoming message from the target trainee;

performing automated next inquiry formulation to send a next inquiry to the target trainee;

applying a natural language answering engine to generate an outgoing message based on the next inquiry formulation; and sending, by the dialog model, the outgoing message to the target trainee.

15. The computer-implemented method of claim 14, further comprising:

determining whether an amount of elapsed time since a last outgoing message exceeds a waiting time threshold; and upon a determination that the amount of elapsed time exceeds the waiting time threshold, causing the dialog model to send another outgoing message to the target trainee.

16. The computer-implemented method of claim 1, wherein the training playbook comprises one or more playbook elements, and wherein the one or more playbook elements comprise an introduction method, an inquiry method, a subdialog management, a conditional dialog management, a schedule control, branch discussion handling, custom knowledge extraction, and/or termination criteria.

17. A system to train a potential target of social engineering against an attack by an adversarial actor, comprising:

a database system configured to store data associated with a training;

a management system configured to access the database system and manage the training;

one or more processors; and data storage, wherein the data storage has stored thereon computer-executable instructions that, when executed by the one or more processors, cause the management system to perform operations comprising:

retrieving, based on one or more target-persona pairing attributes comprising an identity of a target trainee, an identity of a synthetic persona, and one or more training parameters and from the database system, a previously generated training playbook, the previously generated training playbook having been generated based on a plurality of conversational patterns from a respective plurality of dialogs, wherein a given conversational pattern of the plurality of conversational patterns comprises one or more dialog interaction elements utilized by the adversarial actor during a respective dialog of the plurality of dialogs;

configuring, based on the one or more target-persona pairing attributes and from the database system, a dialog model for a synthetic persona to engage in a training dialog with the target trainee to train the target trainee to detect, avoid and/or mitigate a future attack by the adversarial actor, wherein the dialog model is configured to emulate the future attack by the adversarial actor by utilizing the previously generated training playbook;

initializing, based on the previously generated training playbook, the dialog model to engage in the training dialog with the target trainee; and deploying the synthetic persona to engage in the training dialog with the target trainee.

18. The system of claim 17, the operations further comprising:

determining a training attribute comprising one or more of an information content to be obtained from the target trainee, a message count of the training dialog, a duration of the training dialog, or one or more attributes related to the target trainee; and terminating the training dialog based on the training attribute.

19. A computing device for creating a training playbook to train a potential target of social engineering against an attack by an adversarial actor, comprising:

one or more processors; and data storage, wherein the data storage has stored thereon computer-executable instructions that, when executed by the one or more processors, cause the computing device to perform operations comprising:

generating a training playbook based on a plurality of conversational patterns from a respective plurality of dialogs between non-human synthetic persona with the adversarial actor, wherein a given conversational pattern of the plurality of conversational patterns comprises one or more dialog interaction elements utilized by the adversarial actor during a respective dialog of the plurality of dialogs;

configuring a dialog model for a second synthetic persona to engage in a training dialog with a target trainee to train the target trainee to detect, avoid and/or mitigate a future attack by the adversarial actor, wherein the dialog model is configured to emulate the future attack by the adversarial actor by utilizing the training playbook; and outputting the training playbook.

20. The computing device of claim 19, wherein the training playbook comprises one or more playbook elements, and wherein the one or more playbook elements comprise an introduction method, an inquiry method, a subdialog management, a conditional dialog management, a schedule control, branch discussion handling, custom knowledge extraction, and/or termination criteria.

* * * * *